(12) United States Patent
Thorp et al.

(10) Patent No.: US 7,023,260 B2
(45) Date of Patent: Apr. 4, 2006

(54) CHARGE PUMP CIRCUIT INCORPORATING CORRESPONDING PARALLEL CHARGE PUMP STAGES AND METHOD THEREFOR

(75) Inventors: Tyler J. Thorp, Sunnyvale, CA (US); Roy E. Scheuerlein, Cupertino, CA (US)

(73) Assignee: Matrix Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 10/610,315

(22) Filed: Jun. 30, 2003

(65) Prior Publication Data

US 2004/0263238 A1 Dec. 30, 2004

(51) Int. Cl.
*G05F 1/10* (2006.01)
*G05F 3/02* (2006.01)

(52) U.S. Cl. .................................................... 327/536
(58) Field of Classification Search ................ 327/536, 327/589; 363/59–60
See application file for complete search history.

(56) References Cited

U.S. PATENT DOCUMENTS

| | | | | |
|---|---|---|---|---|
| 4,935,644 A | 6/1990 | Tsujimoto | ................ | 327/536 |
| 5,036,229 A | 7/1991 | Tran | ................ | 387/497 |
| 5,422,586 A | 6/1995 | Tedrow et al. | ................ | 327/306 |
| 5,432,469 A | 7/1995 | Tedrow et al. | ................ | 327/306 |
| 5,508,971 A | 4/1996 | Cernea et al. | ........ | 365/185.18 |
| 5,596,532 A | 1/1997 | Cernea et al. | ........ | 365/185.18 |
| 5,699,387 A | 12/1997 | Seto et al. | ................ | 375/376 |
| 5,767,735 A | 6/1998 | Javanifard et al. | ........ | 327/536 |
| 5,818,289 A | 10/1998 | Chevallier et al. | ........ | 327/536 |
| 5,898,328 A | 4/1999 | Shoji | ................ | 327/157 |
| 5,942,949 A | 8/1999 | Wilson et al. | ................ | 331/17 |
| 5,973,546 A | 10/1999 | Le et al. | ................ | 327/536 |
| 5,978,283 A | 11/1999 | Hsu et al. | ........ | 365/189.09 |
| 6,272,670 B1 | 8/2001 | Van Myers et al. | ........ | 716/17 |
| 6,385,074 B1* | 5/2002 | Johnson et al. | ........ | 365/103 |
| 6,483,728 B1 | 11/2002 | Johnson et al. | ........ | 363/60 |
| 6,486,728 B1 | 11/2002 | Kleveland | ........ | 327/536 |
| 6,501,325 B1* | 12/2002 | Meng | ........ | 327/536 |
| 6,525,949 B1* | 2/2003 | Johnson et al. | ........ | 363/60 |
| 6,545,529 B1* | 4/2003 | Kim | ........ | 327/536 |
| 2001/0010477 A1 | 8/2001 | Myono | ........ | 327/536 |
| 2001/0013804 A1 | 8/2001 | Lin et al. | ........ | 327/390 |
| 2002/0130703 A1* | 9/2002 | Tsai | ........ | 327/536 |

OTHER PUBLICATIONS

Jieh-Tsorng Wu and Kuen-Long Chang, MOS Charge Pumps for Low-Voltage Operation, IEEE Journal of Solid-State Circuits, vol. 33, No. 4, Apr. 1998, pp. 592-597.

Dickson, John F., "On-Chip High-Voltage Generation in MNOS Integrated Circuits Using an Improved Voltage Multiplier Technique," IEEE Journal of Solid-State Circuits, vol. SC-11, No. 3, Jun. 1976, pp. 374-378.

(Continued)

*Primary Examiner*—Quan Tra
(74) *Attorney, Agent, or Firm*—Zagorin O'Brien Graham LLP

(57) ABSTRACT

An improved charge pump circuit efficiently utilizes multiple charge pump stages to produce output voltages much larger than the power supply voltage by incorporating, in some embodiments, two parallel strings of series-coupled charge pump stages. Each corresponding charge pump stage in one string is controlled at least by a node in the corresponding charge pump stage of the other string.

53 Claims, 16 Drawing Sheets

OTHER PUBLICATIONS

Gariboldi, Roberto, et al., "A 70 mΩ Intelligent High Side Switch with Full Diagnostics," *IEEE Journal of Solid-State Circuits*, vol. 31, No. 7, Jul. 1996, pp. 915-923

Kawahara, Takayuki, et al., "Bit-Line Clamped Sensing Multiplex and Accurate High Voltage Generator for Quarter-Micron Flash Memories," *IEEE Journal of Solid-State Circuits*, vol. 31, No. 11, Nov. 1996, pp. 1590-1600.

Kawahara, Takayuki, et al., "Internal Voltage Generator for Low Voltage, Quarter-Micrometer Flash Memories," *IEEE Journal of Solid-State Circuits*, vol. 33, No. 1, Jan. 1998, pp. 126-132.

Tanzawa, Toru, et al., "A Dynamic Analysis of the Dickson Charge Pump Circuit," *IEEE Journal of Solid-State Circuits*, vol. 32, No. 8, Aug. 1997, pp. 1231-1240.

Wang, Chi-Chang, et al., "Efficiency Improvement in Charge Pump Circuits," *IEEE Journal of Solid-State Circuits*, vol. 32, No. 6, Jun. 1997, pp. 852-860.

* cited by examiner

CHARGE PUMP CIRCUIT INCORPORATING CORRESPONDING PARALLEL CHARGE PUMP STAGES AND METHOD THEREFOR

BACKGROUND

1. Field of the Invention

The present invention relates to semiconductor voltage generator circuits, and particularly to capacitive voltage multiplier circuits.

2. Description of the Related Art

Many integrated circuits, particularly those using a single power supply voltage, incorporate on-chip circuitry to generate a "boosted" voltage having a magnitude greater than the power supply voltage. Frequently this boosted voltage is used as a veritable power supply voltage for portions of the circuitry contained on the integrated circuit. For example, certain types of semiconductor memories, such as "flash" EEPROM memories, write a memory cell by accelerating electrons across a tunneling dielectric and storing the charge on a floating gate above a field effect transistor. On contemporary devices, this acceleration of charge across the tunneling dielectric frequently requires a "write voltage" on the order of 8 volts, yet the remainder of the operations of the memory circuitry typically requires a voltage on the order of only 3 volts, including reading the memory cells. Unlike many older devices which require two different power supply voltages be supplied to operate the device (e.g., +5 and +12 volts), many contemporary devices require only a single power supply voltage (usually called VDD) equal to 2.5–3.3 volts (relative to "ground" or VSS). This VDD power supply voltage is typically utilized to power most of the device, including the normal read operation circuits. The write voltage (frequently, although not always, called VPP for legacy reasons) is generated by an on-chip voltage generator having a typical value of +8 volts (again relative to VSS) rather than requiring a separate power supply voltage be supplied by a user of the device.

In many integrated circuits, such on-chip voltage generators are implemented as capacitive voltage multiplier circuits, largely because of the historical ease of implementing suitably large capacitors on a monolithic integrated circuit, especially compared to implementing good quality inductors. These capacitive voltage multiplier circuits are usually called "charge pumps" by those in the art. Not to be confused with capacitive voltage multiplier circuits, there is another class of circuits also frequently called charge pumps. These are frequently used to integrate small current pulses generated each cycle by a phase detector circuit, and to consequently generate an analog voltage on a capacitor node which represents the phase error between two phase detector input signals. During each cycle, a typical phase detector "pumps" a first current pulse into the capacitor node and "pumps" a second current pulse from the capacitor node. If the phase error is zero, these two current pulses are equal, and the voltage on the capacitor node is unchanged. But if the phase of one input signal lags the other, one of the current pulses is greater in magnitude, or longer in duration, or both, so that the net charge into the capacitor node is non-zero, and a voltage change results. Such "phase detector integrator" charge pumps are quite different in both function and structure, and are consequently not considered to be related to capacitive voltage multiplier circuits. Consequently, as used herein, a "charge pump" refers to a capacitive voltage multiplier circuit and not to such phase detector integrator circuits, unless the context so requires.

In the nonvolatile memory example described above, the write voltage generated by the charge pump is typically higher than the VDD power supply voltage provided to the device. In other integrated circuits, a charge pump may be used to generate a voltage below the reference voltage VSS (i.e., "below ground"). For example, a negative bias voltage is generated in many memory devices such as dynamic random access memories (DRAMs), static random access memories (SRAMs), and other circuits, to bias a substrate and/or a CMOS well within the substrate.

Referring now to FIG. 1, a schematic diagram of a traditional (and very well known) charge pump circuit for generating a boosted voltage above VDD is shown, which circuit is taught by John F. Dickson in "On-Chip High-Voltage Generation in NMOS Integrated Circuits Using an Improved Voltage Multiplier Technique," IEEE Journal of Solid State Circuits, Vol. SC-11, No. 3, June 1976, pp. 374–378. The charge pump 100 includes a plurality of serially-connected charge pump stages, one of which is labeled 102. Each charge pump stage includes a charge transfer device, such as diode 104, and a pump capacitor, such as capacitor 106, and has an input node, such as node 108, and an output node, such as node 110. A complementary pair of clock signals CLK and /CLK (labeled in the figure as CLK "bar" with the traditional inverting "bar" over the name) are provided to drive the various pump stage capacitors. Odd-numbered (or alternately even-numbered) pump stages are driven by the CLK signal, while even-numbered (alternately odd-numbered) pump stages are driven by the /CLK signal. The input node of the first serially-connected charge pump stage, here labeled as node 111, is usually connected to the VDD power supply (at least for generating a positive boosted voltage). A final isolation diode 114 may be considered as part of the last serially-connected charge pump stage, and the output voltage of the charge pump 100 taken from node 116 rather than from node 112 (which would otherwise be considered the output node of the last serially-connected charge pump stage).

The complementary clock signals are usually driven with full VDD-level swings (i.e., transitioning between a low level of VSS and a high level of VDD). Consequently, each charge pump stage boosts the voltage conveyed to its input node by an amount equal to VDD less a diode drop (assuming relatively negligible DC current and ignoring second order effects). Including the effect of the last isolating diode 114, the maximum theoretical output voltage achievable from such a charge pump 100 is equal to VDD(N)–VDIODE (N+1), where N is the number of charge pump stages and VDIODE is the forward diode drop. In practice, the diodes are frequently implemented as diode-connected FETs (field effect transistors), each with its gate terminal and drain terminal connected together to form one terminal of the diode, and its source terminal forming the other terminal of the diode. Also, the capacitors are frequently implemented as large area FETs, each with its source terminal and drain terminal connected together to form one terminal of the capacitor, and its gate terminal forming the other terminal of the capacitor. Furthermore, the output voltage is usually somewhat less than this theoretical value, due to stray capacitances, incomplete charge transfer, DC current flow provided into the output node, and other effects, which have been well studied in the literature.

At lower power supply voltages, the diode drop lost by each charge pump stage significantly affects the final output voltage achievable by such a charge pump circuit. Consequently, other charge pump circuits replace the diode charge transfer device with a charge transfer switch device (or charge transfer switch, CTS) in each charge pump stage. Referring now to FIG. 2, such a charge pump stage 120 includes a charge transfer switch 126 connecting an input 122 to an output 124, a pump capacitor 128 connected to the output 124, and a control circuit 130 for generating a control node 132 for the charge transfer switch 126. A pulse input 134 is driven by a clock signal, such as one of a complementary pair of clock signals CLK and /CLK, depending upon the relative placement of the charge pump stage within the charge pump circuit.

It is desirable to control the charge transfer switch 126 to reduce the forward drop across the charge transfer switch 126 when turned on to transfer charge from input to output, and to carefully control the time that the charge transfer switch 126 is turned on to prevent back transfer of charge from output to input. A variety of techniques are found in the art for controlling a charge transfer switch device in attempt to simultaneously achieve these two competing goals. Nevertheless, additional improvements in charge pump circuits are desired.

Moreover, such voltage generator circuits also may consume a significant amount of power relative to the remainder of the circuit, and thus increase the current that must be supplied by the user (e.g., by the VDD power supply). Any increase in power dissipation may also increase the temperature of the die during operation. In a battery-powered environment, any increase in power consumed by a device may have significant implications for battery life, and any additional heat generated may also be difficult to dissipate. Consequently, continued improvements in charge pump circuits are desired.

SUMMARY

In a charge pump circuit utilizing a charge transfer switch (CTS), it is desirable to control the CTS in such a way as to reduce the forward drop across the CTS during charge transfer, and to carefully control the time that the CTS is turned on to prevent back transfer of charge. The forward drop during charge transfer dissipates power proportional to the current through the CTS and proportional to the forward drop. An N-channel transistor (e.g., NMOS) device may have a smaller forward drop than either a P-channel transistor (e.g., PMOS) device or a diode, but an NMOS device requires a higher voltage on its control node (e.g., control node 132) than on its output node in order to turn on, and generating such high voltages is difficult without wasting power. Moreover, power is wasted if the control node rises to an unnecessarily high voltage. A PMOS charge transfer switch device has lower than desired conductivity and passes less current for a given voltage difference, thus also wasting power. Power is also wasted if the CTS is still on when the input node falls below the output node, because charge will transfer from the output node back through the CTS (rather than to the next charge pump stage). It is difficult to provide the voltage levels and timing of the control node to achieve a low forward drop when the CTS should be on, and yet avoid back transfer of charge as the CTS shuts off.

The present invention provides an improved charge pump circuit which, in certain embodiments, efficiently utilizes multiple charge pump stages to produce output voltages much larger than the power supply voltage. Such a circuit is particularly desirable for low power integrated circuits operating at low voltages, although may be beneficial in other environments as well.

In some embodiments, the present invention provides a charge pump circuit incorporating two parallel strings of series-coupled charge pump stages. Each corresponding charge pump stage in one string is controlled at least by a node in the corresponding charge pump stage of the other string.

Many particular circuit arrangements of pump stages are contemplated by the present invention, including charge pump circuits for generating a positive voltage higher than either supply voltage received by the charge pump circuit, and charge pump circuits for generating a negative voltage lower than either supply voltage received by the charge pump circuit.

The invention in several aspects is particularly suitable for implementation within an integrated circuit, including those integrated circuits having a memory array, for methods for operating such integrated circuits, and for computer readable media encodings of such integrated circuits, all as described herein in greater detail and as set forth in the appended claims. A wide variety of such integrated circuits is specifically contemplated, including those having a three-dimensional memory array formed above a substrate.

The foregoing is a summary and thus contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, may be apparent from the detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar, related, or identical items.

DETAILED DESCRIPTION

Figure 1:
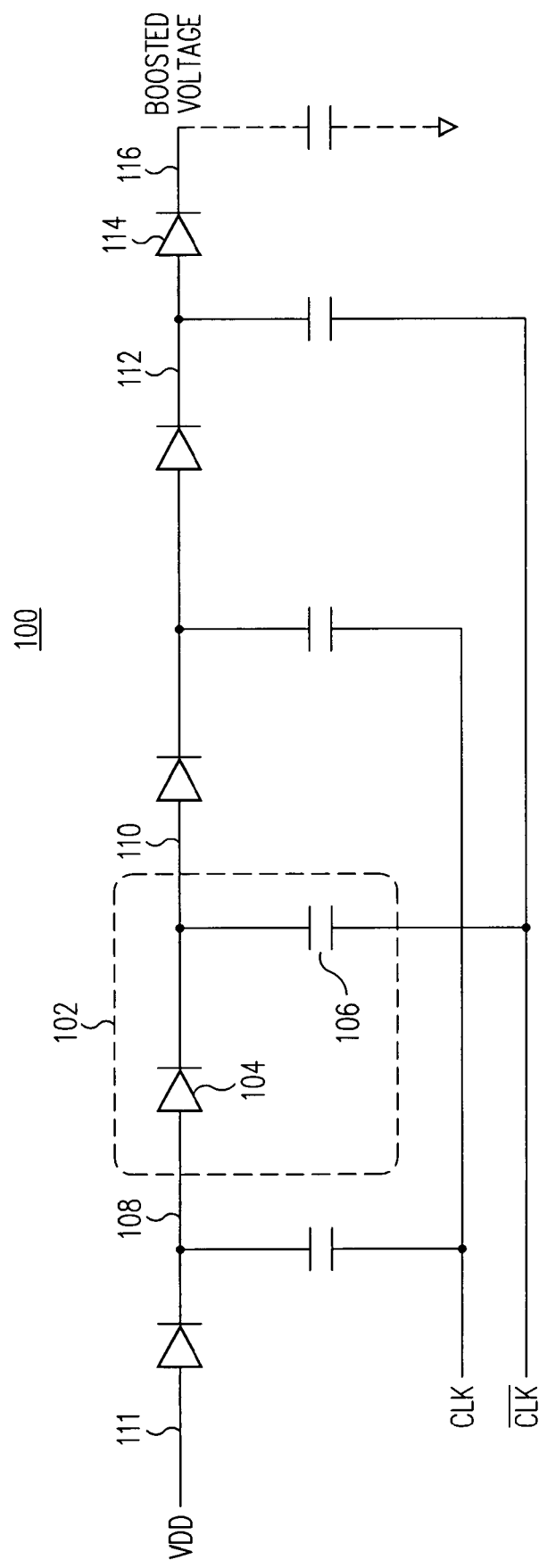
FIG. 1, labeled prior art, depicts a traditional charge pump circuit for generating a voltage above VDD.
Figure 2:
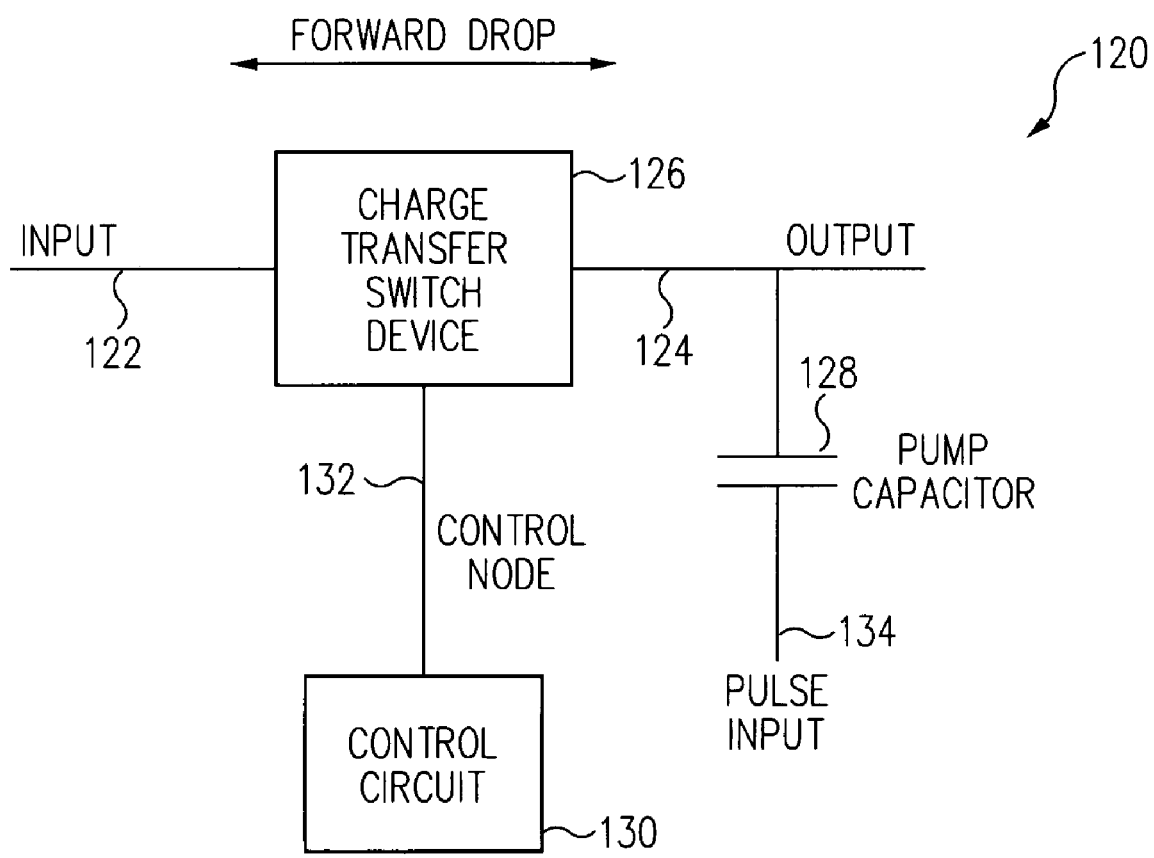
FIG. 2, labeled prior art, depicts a charge pump stage utilizing a charge transfer switch device.
Figure 3:
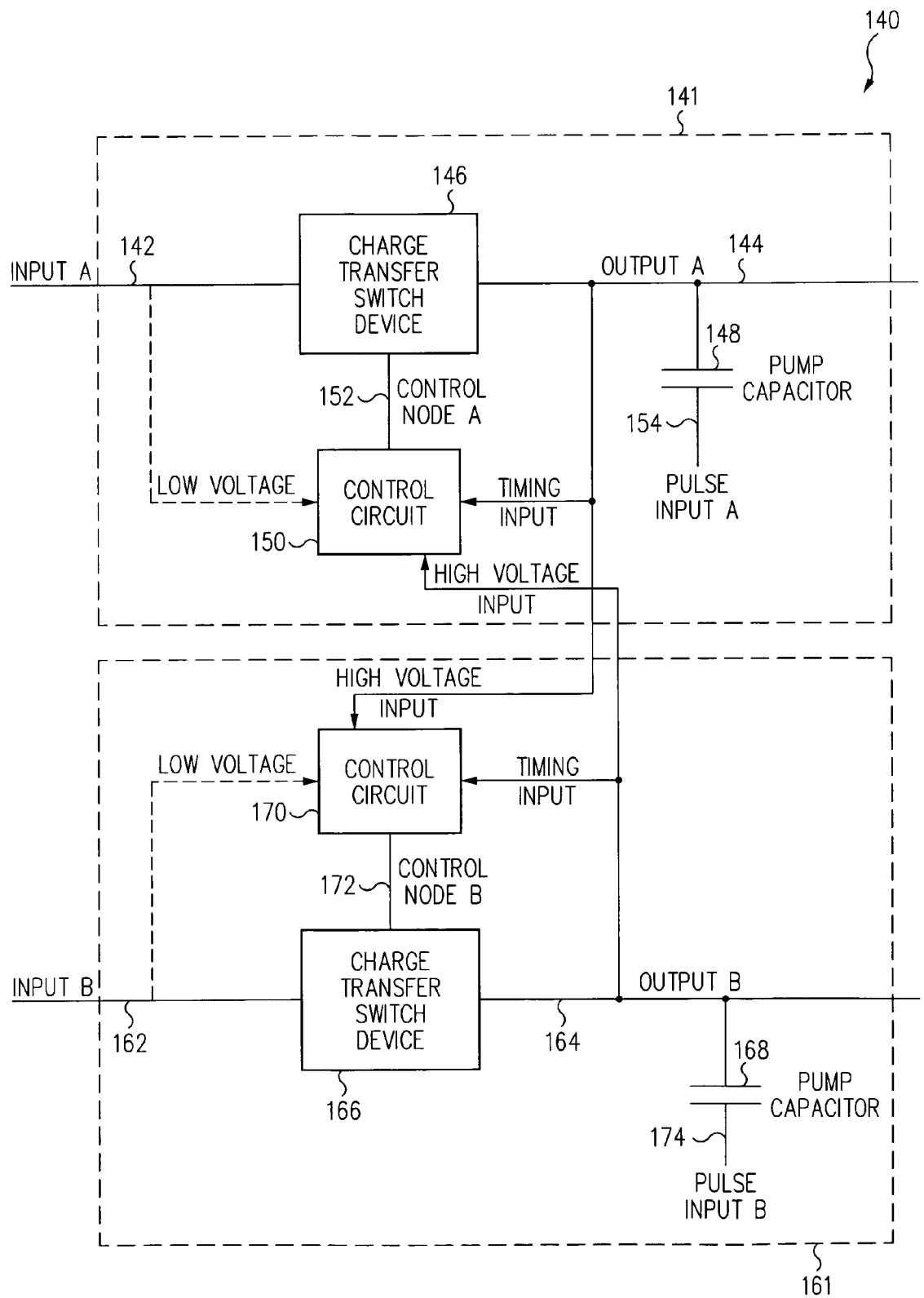
FIG. 3 depicts a block diagram of a pair of cross-coupled charge pump stages in accordance with certain embodiments of the present invention.

Referring now to FIG. 3, two charge pump stages 141, 161 within an exemplary charge pump circuit 140 are depicted. Charge pump stage 141 represents a charge pump stage within a first string of series-coupled charge pump stages, while charge pump stage 161 represents a charge pump stage within a second string of series-coupled (i.e., serially-connected) charge pump stages. The charge pump stage 141 within the first string corresponds to the charge pump stage 161 in the other string, and is controlled by a node in the corresponding charge pump stage 161.

The charge pump stage 141 includes a charge transfer switch 146 connecting an input 142 to an output 144, a pump capacitor 148 connected to the output 144, and a control circuit 150 for generating a control node 152 for the charge transfer switch 146. A pulse input 154 is driven by a pulse signal, such as one of a complementary pair of clock signals CLK and /CLK, depending upon the placement of the charge pump stage within the charge pump circuit, as described in greater detail below.

The charge pump stage 161 includes a charge transfer switch 166 connecting an input 162 to an output 164, a pump capacitor 168 connected to the output 164, and a control circuit 170 for generating a control node 172 for the charge transfer switch 166. A pulse input 174 is driven by a pulse signal which is complementary to the pulse signal coupled to the pulse input 154 of charge pump stage 141.

Each control circuit of a charge pump stage receives a timing input signal from its own charge pump stage and receives a voltage input from a node in the corresponding charge pump stage. For example, the control circuit 150 includes a timing input responsive to the output 144 of charge pump stage 141, and receives a 'high voltage' input responsive to the output 164 of the charge pump stage 161. Conversely, the control circuit 170 includes a timing input responsive to the output 164 of charge pump stage 161, and receives a 'high voltage' input responsive to the output 144 of the charge pump stage 141. Consequently, each corresponding charge pump stage in one string may be viewed as being controlled by a node in the corresponding charge pump stage of the other string.

In certain exemplary embodiments, the timing input of the control circuit 150 selects which of two voltage levels are coupled to the control node 152: a first voltage level for turning on the charge transfer switch 146, or a second voltage level for turning off the charge transfer switch 146. The first voltage level (here shown as the 'high voltage' input of the control circuit 150) is conveyed by the output 164 of the other charge pump stage 161. This first voltage level conveyed on output 164 is high enough, relative to the voltage of output 144, to turn on charge transfer switch 146 (assuming an NMOS charge transfer switch). The second voltage level (here shown as the 'low voltage' input of the control circuit 150), is conveyed by the input 142 to the same charge pump stage 141, which is low enough to turn off charge transfer switch 146 and prevent back charge transfer. In operation, each of these three inputs to the control circuit 150 is actually a time-varying signal rather than a constant voltage, as described in greater detail below.

As for the corresponding charge pump stage 161, the control circuit 170 is symmetrically connected. The timing input of the control circuit 170 likewise selects either a first voltage level (e.g., the output 144) for turning on the charge transfer switch 166, or a second voltage level (e.g., the input 162) for turning off the charge transfer switch 166, and conveys the selected voltage to the control node 172.

Figure 4:
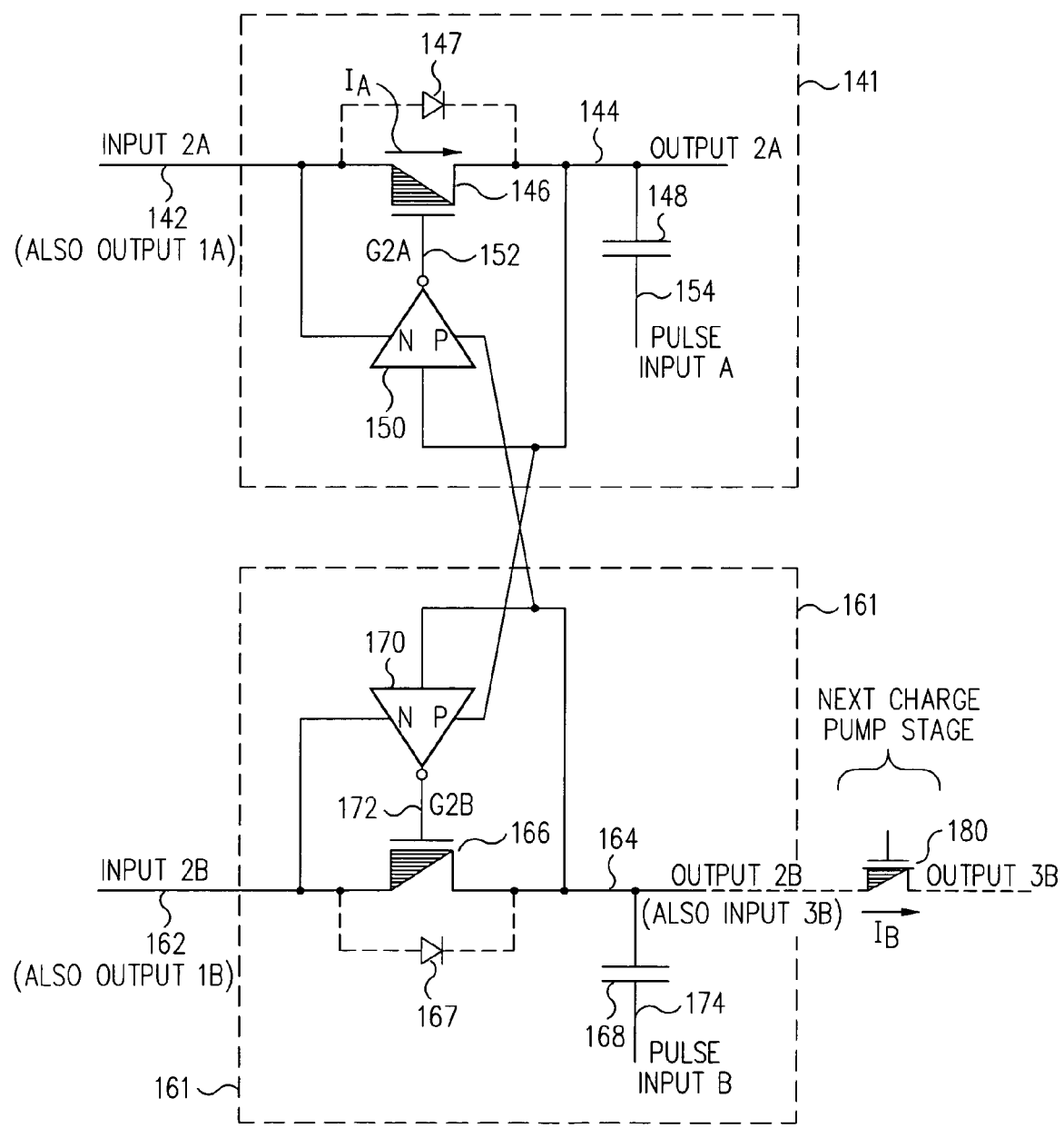
FIG. 4 depicts a pair of cross-coupled charge pump stages in accordance with certain embodiments of the present invention.

Referring now to FIG. 4, an exemplary embodiment of such a pair of cross-coupled charge pump stages is depicted. The charge transfer switches 146, 166 are implemented as NMOS transistors. The control circuit 150 is implemented as a CMOS inverter whose input is coupled to the output 144, whose "VDD connection" is coupled to the output 164 of the other charge pump stage 161, and whose "VSS connection" is coupled to the input 142. The control circuit 170 is implemented as a CMOS inverter whose input is coupled to the output 164, whose "VDD connection" is coupled to the output 144 of the other charge pump stage 141, and whose "VSS connection" is coupled to the input 162. Startup diodes 147, 167 are respectively connected from the respective input 142, 162 to the respective output 144, 164 to ensure adequate startup of the charge pump circuit. Such startup diodes may be implemented, for example, as literal diodes (should the technology provide such) and as diode-connected NMOS transistors. Preferably all NMOS and PMOS transistors are low threshold voltage devices having a nominal threshold voltage of approximately 250 mV, and with typical manufacturing tolerances, having a minimum expected threshold voltage of slightly above zero volts. If available in the manufacturing technology, all devices are also preferably fabricated as high-voltage devices. The NMOS device 180 represents a charge transfer switch device within the succeeding charge pump stage, as is described below.

Figure 5:
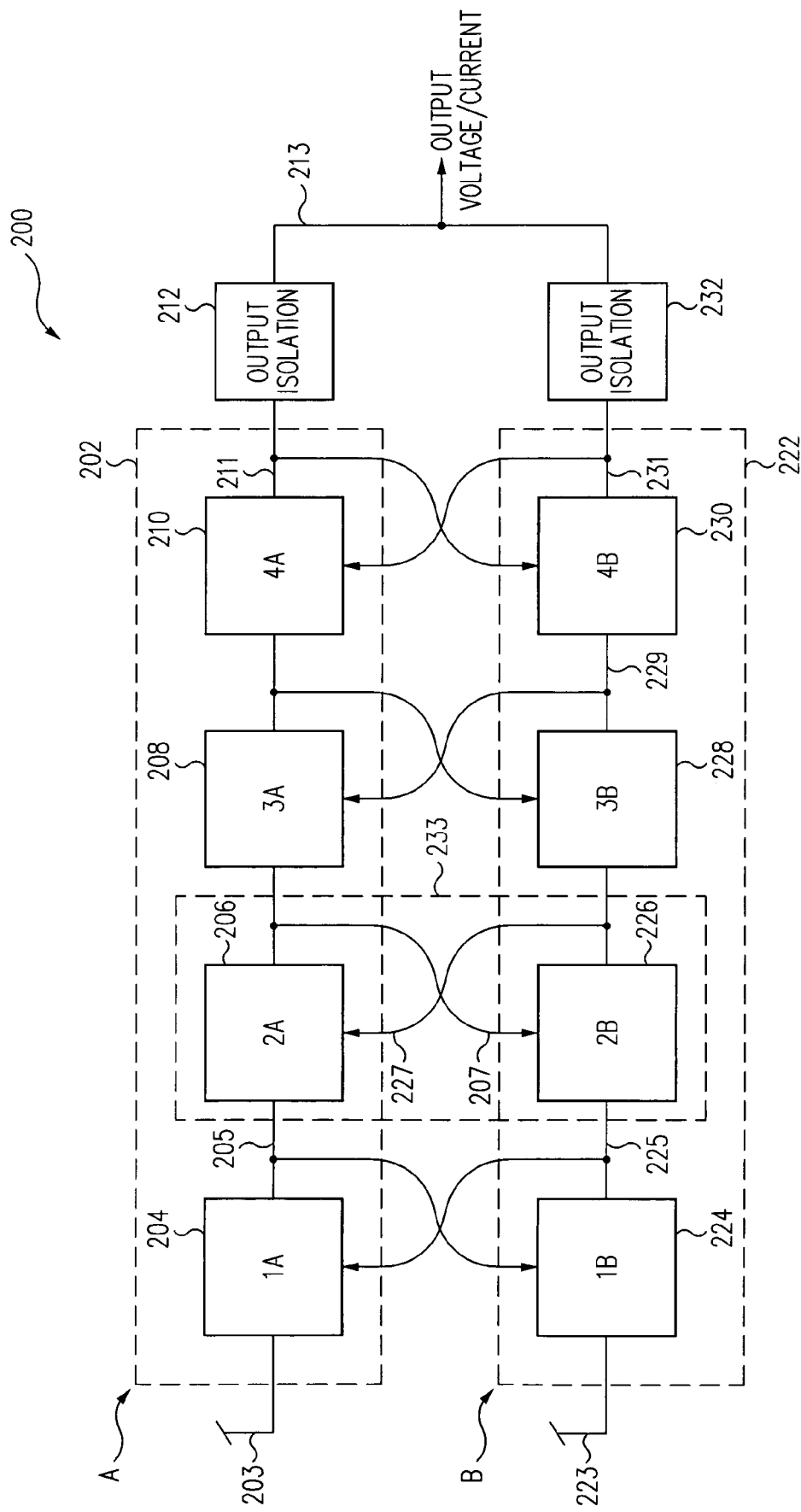
FIG. 5 depicts a charge pump circuit incorporating two parallel series-connected strings of charge pump stages.
Figure 8:
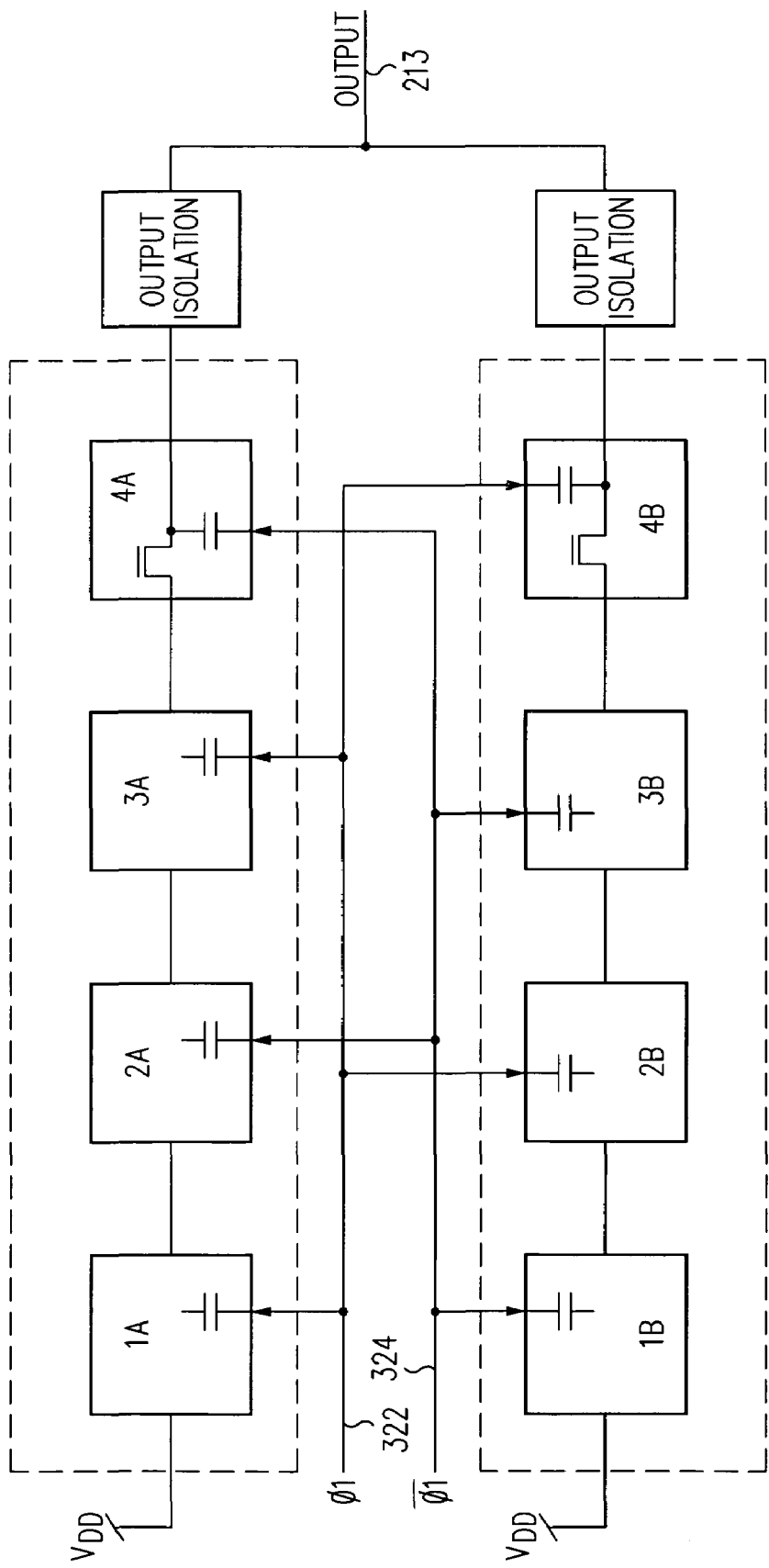
FIG. 8 depicts a clocking arrangement for a charge pump circuit.

Referring now to FIG. 5, a exemplary charge pump circuit 200 is depicted which includes a first series-connected string of charge pump stages 202 and a second series-connected string of charge pump stages 222. The first string 202 includes charge pump stages 204, 206, 208, and 210, and an isolation circuit 212, while the second string 222 includes charge pump stages 224, 226, 228, and 230, and an isolation circuit 232. Adjacent charge pump stages in each string are clocked by complementary pulse signals (not shown) and corresponding charge pump stages are also clocked by complementary pulse signals (not shown). For example, charge pump stages 1A, 2B, 3A, and 4B (i.e., those labeled 204, 226, 208, and 230) may be driven by pulse signals of a given phase (although not necessarily the same clock signal, as described in greater detail below), whereas charge pump stages 1B, 2A, 3B, and 4A (i.e., those labeled 224, 206, 228, and 210) may be driven by pulse signals of a substantially complementary phase to the given phase (again, although not necessarily the same clock signal). FIG. 8 depicts an exemplary complementary clocking where the charge pump stages 1A, 2B, 3A, and 4B are driven by a pulse signal 322, and the charge pump stages 1B, 2A, 3B, and 4A are driven by a complementary pulse signal 324. The respective input to the first charge pump stage in each series-connected string of charge pump stages is coupled to VDD, and the combined output 213 generates a positive boosted voltage above VDD. As can be inferred, each of a corresponding pair of charge pump stages has a substantially equal average voltage signal coupled to its respective input. For example, the respective stages 2A, 2B both receive a respective input signal which generally traverses between a high level of about 1.8·VDD and a low level of about VDD. In the case of the first charge pump stages, the respective input connections to VDD may also be viewed as being connected to signals having substantially equal voltage.

Referring again to FIG. 5, each pair of corresponding charge pump stages in the first and second strings 202, 222, are cross-coupled, to provide a control signal from one of the pair to control the other of the pair. For example, a corresponding pair 233 of charge pump stages includes charge pump stage 206 which is responsive to the output 227 of charge pump stage 226, and includes charge pump stage 226 which is responsive to the output 207 of charge pump stage 206. The intermediate nodes (i.e., inputs and outputs of the charge pump stages) of each string 202, 222 are not tied together, but are independently are driven and boosted. The inputs 203, 223 to the respective first charge pump stage 204, 224 in each string 202, 222, may be both tied to VDD to generate a positive boosted output voltage on node 213, or may be tied to VSS to generate a negative voltage. The inputs 203, 223 may also be tied to other voltages, as described below.

Figure 6:
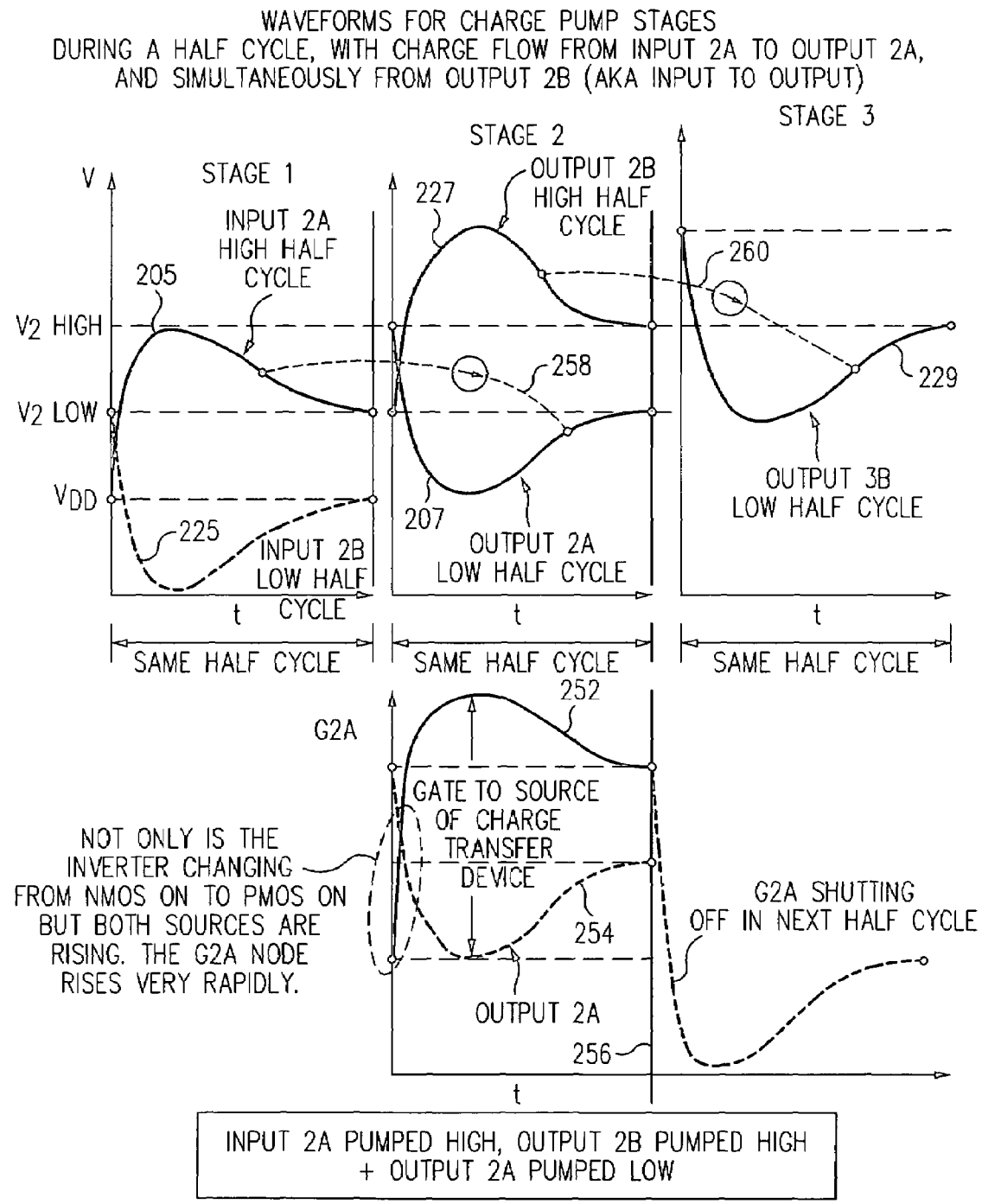
FIG. 6 depicts exemplary waveforms of the charge pump illustrated in FIG. 5 implemented using charge pump stages illustrated in FIG. 4.

Referring now to FIG. 6, representative operating waveforms of several nodes in the charge pump circuit 200 are depicted. These waveforms are described, for ease of illustration, in the context of the exemplary charge pump stages 141, 161, but may correspond to other embodiments of charge pump stages contemplated for use with the invention. The waveforms correspond to a half cycle in which the input 2A (also labeled 142 in FIG. 3, and corresponding to node 205 in FIG. 5) is boosted high, the output 2A (also labeled 144) is boosted low (i.e., by a low half cycle of the pulse input A coupled to node 154), the input 2B (also labeled 162) is boosted low, the output 2B (also labeled 164) is boosted high (i.e., by a high half cycle of the pulse input B coupled to node 174), and the output 3B is boosted low.

As described above, the complementary clocking (i.e., "out of phase" pumping) provides that the output of each charge pump stage is out of phase to the input of the charge pump stage, and also out of phase to the output of the corresponding parallel charge pump stage (i.e., the corresponding charge pump stage in the parallel series-coupled string of charge pump stages). As a consequence, when the charge transfer switch is transferring charge, it has a relatively high drain-to-source voltage (since its input is boosted high while its output is boosted low) and a relatively high gate-to-source voltage, since the gate voltage of the charge transfer switch is determined by the output of the corresponding parallel charge pump stage (which is boosted high). Both of these conditions allow a smaller charge transfer switch device and/or a lower resistance path through the charge transfer switch, both of which increase the power efficiency of the charge pump stage. A smaller charge transfer switch reduces the gate capacitance of the charge transfer switch, and therefore reduces the $\frac{1}{2} \cdot CV^2$ power associated with driving the gate capacitance. A lower resistance reduces the forward drop across the charge transfer switch, which also reduces power dissipation.

To further increase the power efficiency, the control circuit for the gate of the charge transfer switch has no path to either ground or to a power supply, but rather recycles all charge used to charge and discharge the gate. In one of the clock half cycles, charge is drawn from the output of the corresponding parallel charge pump stage to raise the voltage of the charge transfer switch, while in the other half clock cycle that charge is transferred to the input of the charge pump stage (i.e., used to charge the boost capacitor on the output of the preceding stage).

When a charge transfer switch is initially turned on, its gate-to-source voltage initially reaches a relatively large voltage, then, as charge transfer completes, decreases to a voltage equal to the difference in voltage from stage-to-stage. As may be observed in FIG. 6, the gate voltage of the G2A control node 152 is plotted as curve 252, and the output 2A is plotted as curve 254, to visually indicate the large initial gate-to-source voltage of charge transfer switch of the 2A pump stage (i.e., charge transfer switch 146). The PMOS device within the inverter 150 which drives the control node 152 also has the same initially large gate-to-source voltage, which decreases to a voltage which keeps the PMOS device just slightly turned on. The rapid rise of the G2A control node 152 is a result of not only the inverter 150 turning on its PMOS device (and turning off its NMOS device) but also as a result of the source node for the PMOS device and the source node for the NMOS device both increasing. So even before the NMOS is completely turned off, it also helps drive the G2A control node 152 upward in voltage.

The upper waveforms of FIG. 6 all correspond to the same clock half cycle, but are plotted separately for clarity. Charge transfer from the input of stage 2A (node 205) to the output of stage 2A (node 207) is represented by a current symbol labeled 258, and charge transfer from the output of stage 2B (node 227) to the output of stage 3B (node 229) is represented by a current symbol labeled 260.

At the next clock pulse transition (i.e., when the pulse inputs change polarity), which is labeled as time 256, the PMOS device within the control circuit 150 quickly turns off because its source voltage (i.e., the charge pump stage 2B output 164) is boosted lower and because its gate voltage (i.e., the charge pump stage 2A output 144) is boosted higher. The NMOS device within the control circuit 150 quickly turns on because its source voltage (i.e., the charge pump stage 2A input 142) is boosted lower and because its gate voltage (i.e., the charge pump stage 2A output 144) is boosted higher. The NMOS device then quickly discharges the gate G2A (control node 152) of the charge transfer switch 146 to its source (input node 142), thereby quickly shutting off the charge transfer switch to prevent, or at least greatly reduce, any back transfer of charge.

Both the PMOS and NMOS device within the control circuit 150 are quickly turned on or off, as appropriate, in a self-timed manner by relative changes in their respective gate-to-source voltages. No complicated or carefully-timed multi-phase clocks are required.

Figure 7:
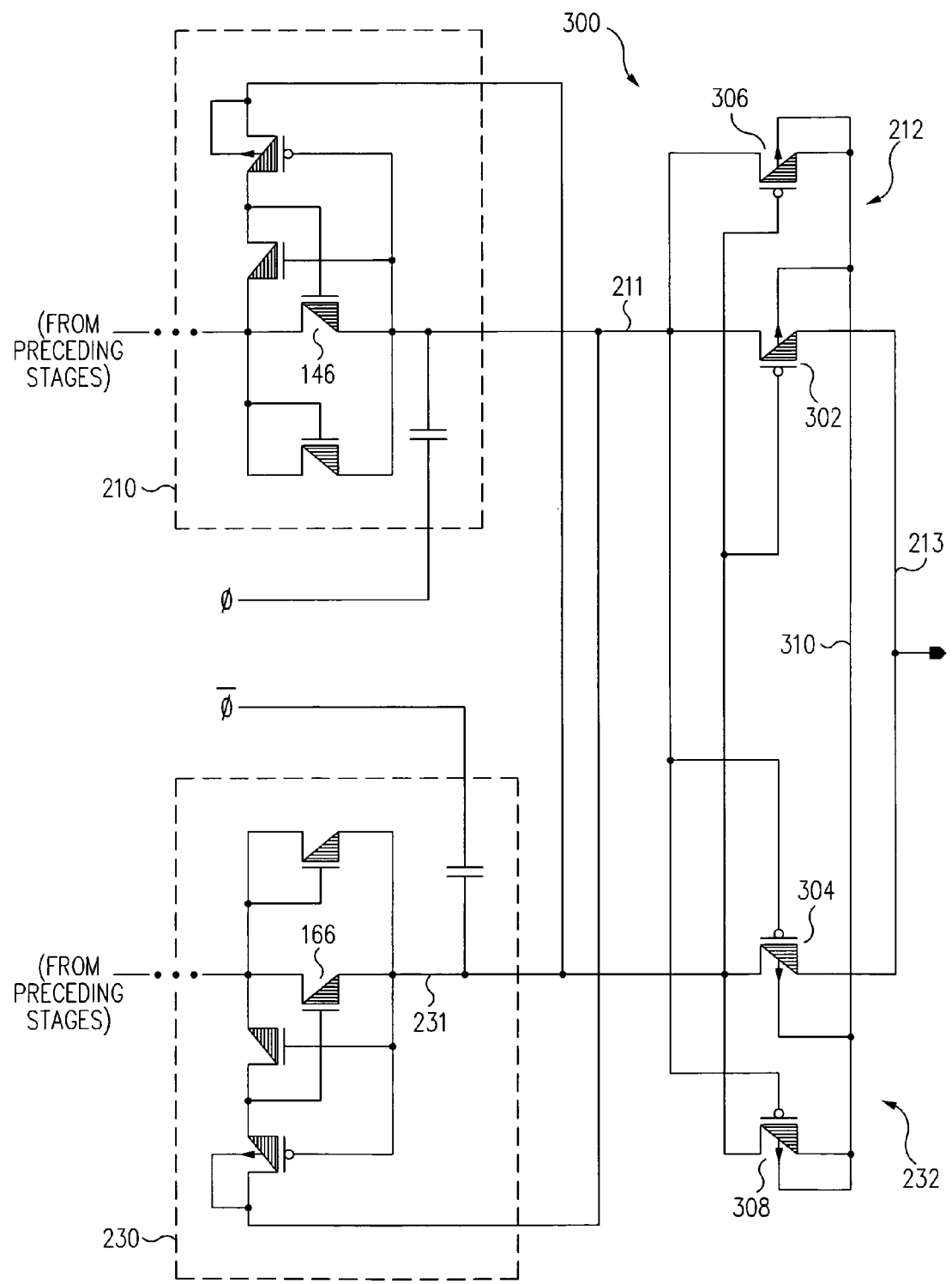
FIG. 7 depicts an output isolation circuit.

Referring again to FIG. 5, a pair of isolation circuits 212, 232 are shown which combine the boosted voltages from both pairs of pump strings into a single output node 213. An exemplary output isolation circuit 300 is depicted in FIG. 7 which includes a pair of cross-coupled PMOS devices 302, 304. Each PMOS device is configured to couple the boosted output of its associated string of charge pump stages to the combined output node 213 when the boosted output of the corresponding charge pump stage is lower in voltage. For example, when output 211 is higher than output 231, PMOS device 302 is turned on to couple output 211 to the combined output 213 and PMOS device 304 is off. During the opposite half-cycle, when output 231 is higher than output 211, PMOS device 304 is turned on to couple output 231 to the combined output 213 and PMOS device 302 is off. By using such cross-coupled PMOS devices, no control voltages higher than the output voltage are needed, and thus the maximum voltage required on any semiconductor junction is no higher than the output voltage itself. Moreover, in certain embodiments, only N-wells are utilized and use of a triple-well technology is not required. Cross-coupled PMOS devices 306, 308 generate a bias voltage on node 310 which is coupled to the N-wells of all four PMOS devices, as shown. In other charge pump circuit embodiments arranged to generate a negative boosted voltage, such isolation devices are preferably NMOS devices.

Also depicted in FIG. 7 is an exemplary embodiment of charge pump stages as described in FIG. 4, showing a transistor-level arrangement of a CMOS inverter style control circuit for each charge transfer switch device.

Figure 9:
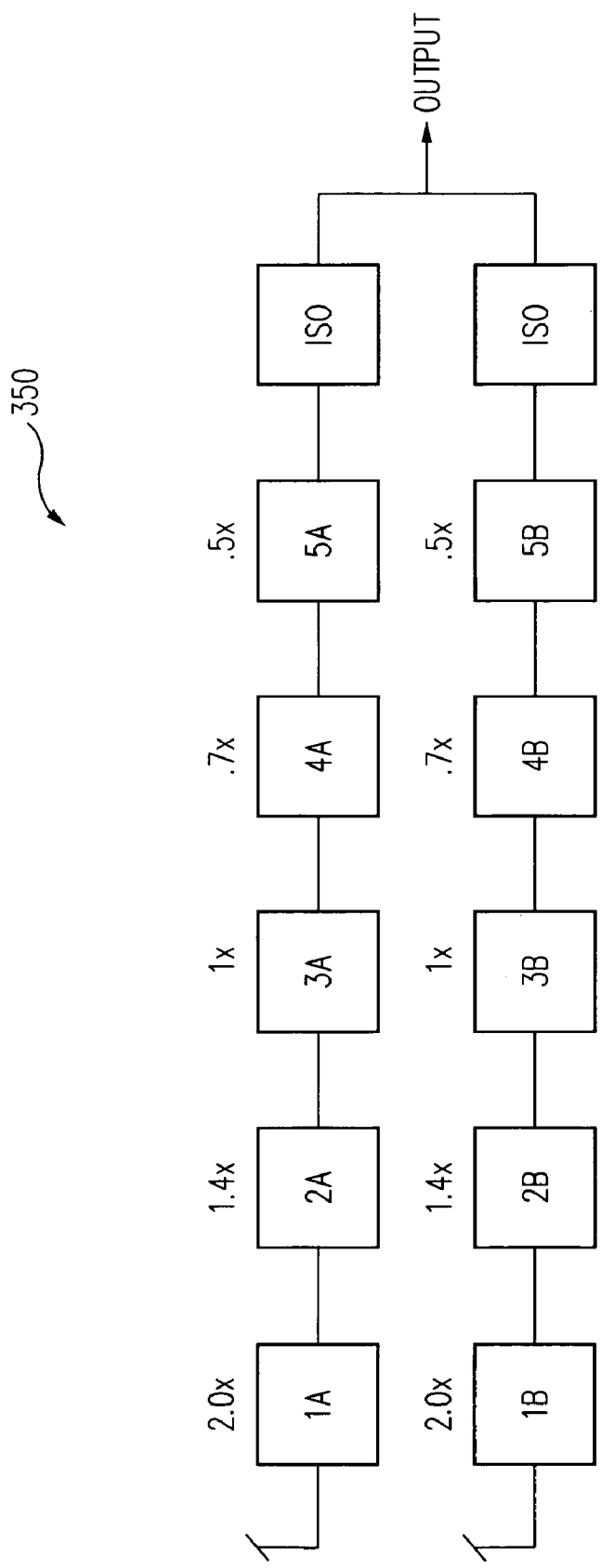
FIG. 9 depicts a charge pump circuit having tapered charge pump stages.

In certain embodiments, each charge pump stage is sized identically to all other charge pump stages. In other embodiments, corresponding charge pump stages in both parallel strings maybe sized substantially identically, but each charge pump stage within a string may be sized to be smaller than the preceding stage in the string. A variety of relative stage sizes is useful, and power efficiency optimization depends upon the amount of stray capacitance, the available area for implementing the charge pump circuit, and particular parameters of the semiconductor devices that are available. An exemplary charge pump circuit 350 is depicted in FIG. 9, which shows five stages in each of the two parallel series-connected strings of "tapered" charge pump stages, with each stage being of a size approximately a factor of SQRT(2)/2 times the size of the preceding stage. With additional numbers of charge pump stages, a smaller difference per stage (i.e., a ratio closer to 1) may be preferred.

Figure 10:
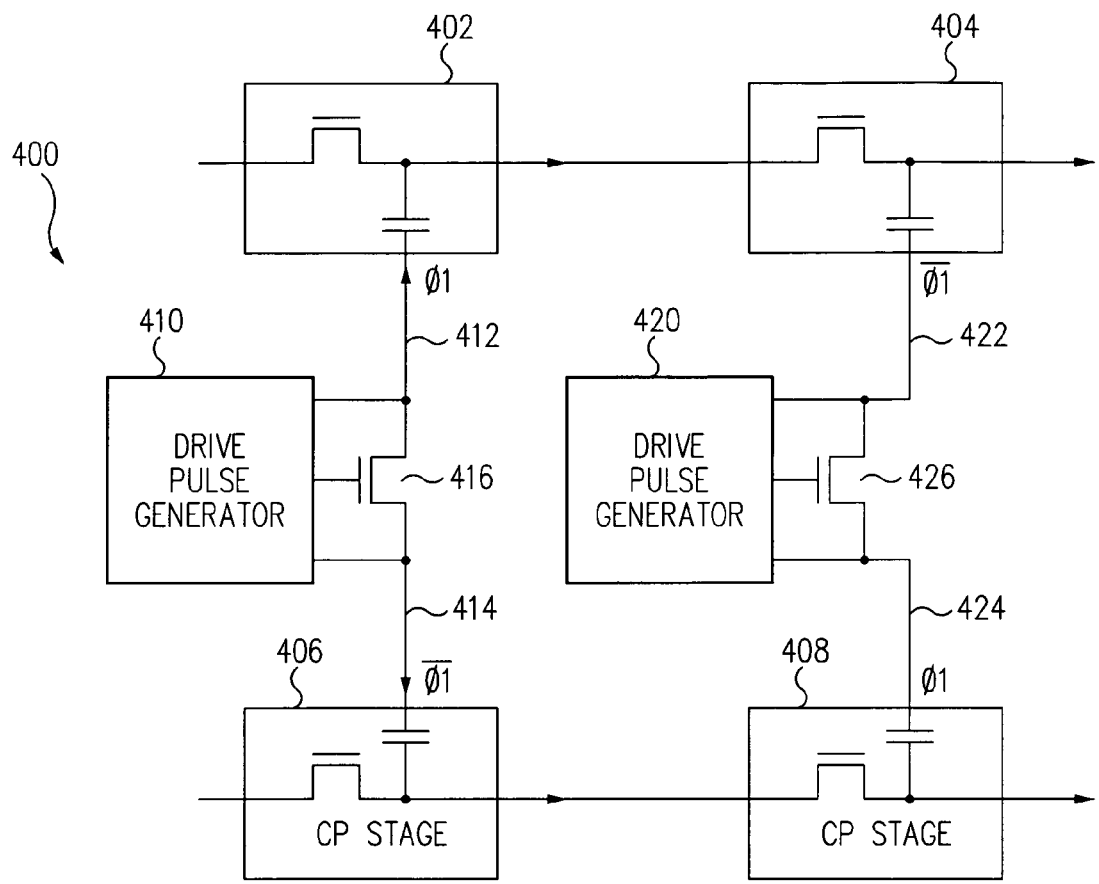
FIG. 10 depicts a charge pump circuit including drive pulse generator circuits for recycling charge between complementary clock phase signals.

The power efficiency of the charge pump circuit may be further increased by charge recycling in the generation of the complementary clocks themselves. Referring now to FIG. 10, a charge pump circuit 400 is shown which may represent a complete charge pump circuit or a portion of a larger charge pump circuit. Corresponding charge pump stages 402 and 406 are clocked respectively by complementary pulse signals 412, 414 which are generated by a drive pulse generator 410. A charge sharing device 416 is included for transferring charge between the two pulse signals 412, 414. Similarly, corresponding charge pump stages 404 and 408 are clocked respectively by complementary pulse signals 422, 424 which are generated by a drive pulse generator 420. A charge sharing device 426 is included for transferring charge between the two pulse signals 422, 424. Pulse signal 422 is out of phase with both pulse signal 412 and pulse signal 424.

Figure 11:
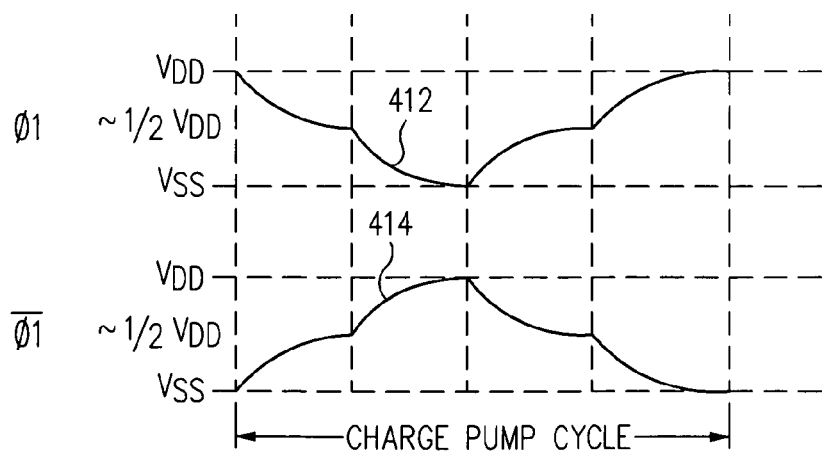
FIG. 11 depicts exemplary waveforms for the circuit illustrated in FIG. 10.

As an example of such power savings, when driving the pulse signals from one state to the other, assume that clock 412 has been previously driven high (e.g., at VDD) and that clock 414 has been previously driven low (e.g., at VSS). To transition the clocks 412, 414 to their opposite states, the driver devices within the drive pulse generator 410 are turned off, and the charge sharing transistor 416 is turned on long enough to bring the voltage of both clocks to approximately one-half VDD. Then transistor 416 is turned off, and other driver devices within the drive pulse generator 410 are enabled to drive clock 412 to VSS, and drive clock 414 to VDD, as depicted in FIG. 11.

Figure 12:
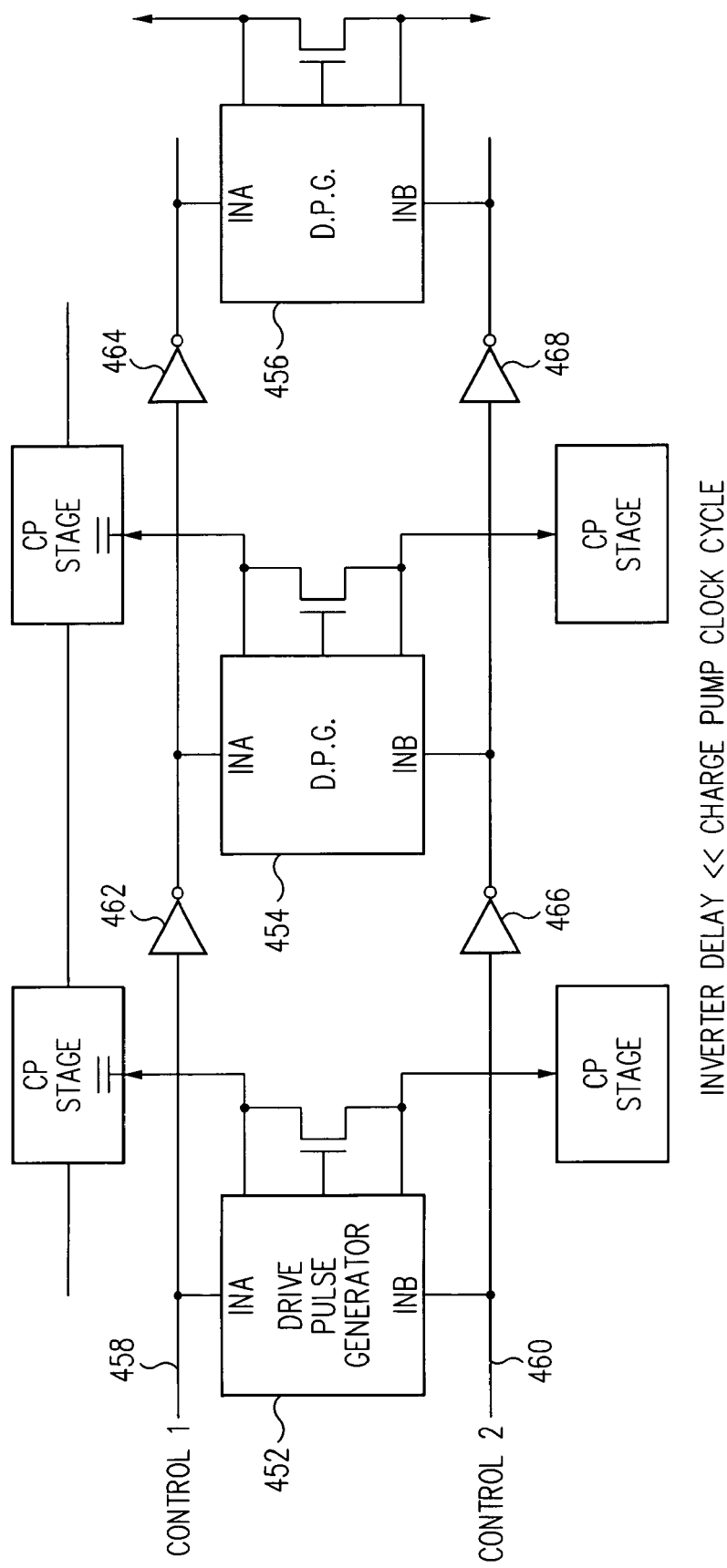
FIG. 12 depicts a charge pump circuit including an arrangement of drive pulse generator circuits for recycling charge between complementary clock phase signals.

The two drive pulse generators 410, 420 may be implemented as identical circuits, but driven with signals appropriate to convey the polarity of the clock signals that each generates. One exemplary arrangement is depicted in FIG. 12, in which substantially identical drive pulse generator circuits 452, 454, 456 are driven by two control signals 458, 460, or by inverted signals derived therefrom. Analogous inputs of each successive drive pulse generator (e.g., input IN_A) are alternately driven by out-of-phase signals as a result of the inverters, and the desired complementary clocking of adjacent charge pump stages is achieved. As long as the delay through inverters 462, 464, 466, and 468 is significantly shorter than the clock cycle for the charge pump circuit, the relative timing of signals associated with each charge pump stage remains substantially undisturbed, and overall operation is unaffected.

Figure 13:
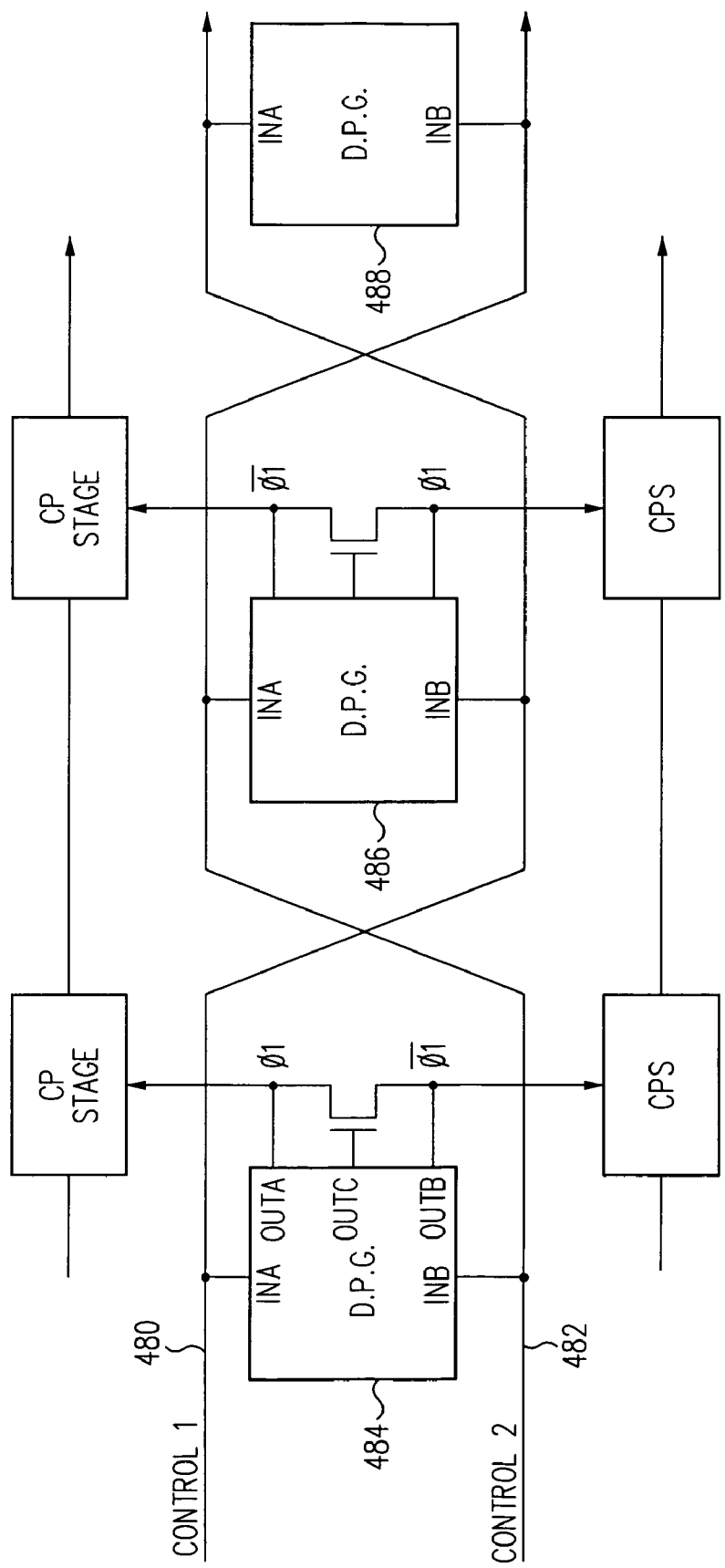
FIG. 13 depicts a charge pump circuit including another arrangement of drive pulse generator circuits for recycling charge between complementary clock phase signals.

Another exemplary clocking arrangement is depicted in FIG. 13, in which analogous inputs of each successive drive pulse generator (e.g., input IN_A) are driven by out-of-phase signals as a result of interchanging the connection of the control signals for each drive pulse generator. For example, the timing control signal 480 is connected to the IN_A input of the drive pulse generator 484, the IN_B input of the drive pulse generator 486, and the IN_A input of the drive pulse generator 488, whereas the timing control signal 482 is connected to the IN_B input of the drive pulse generator 484, the IN_A input of the drive pulse generator 486, and the IN_B input of the drive pulse generator 488, to achieve the desired complementary clocking of both corresponding and adjacent charge pump stages.

As another example, a charge pump circuit as depicted in FIG. 8 may be accomplished using a single charge-recycling drive pulse generator to generate both complementary clocks, which are then routed to the appropriate charge pump stage as shown. As described above, such a charge pump circuit may also be clocked using pulse drivers which do not recycle charge at all.

Figure 14:
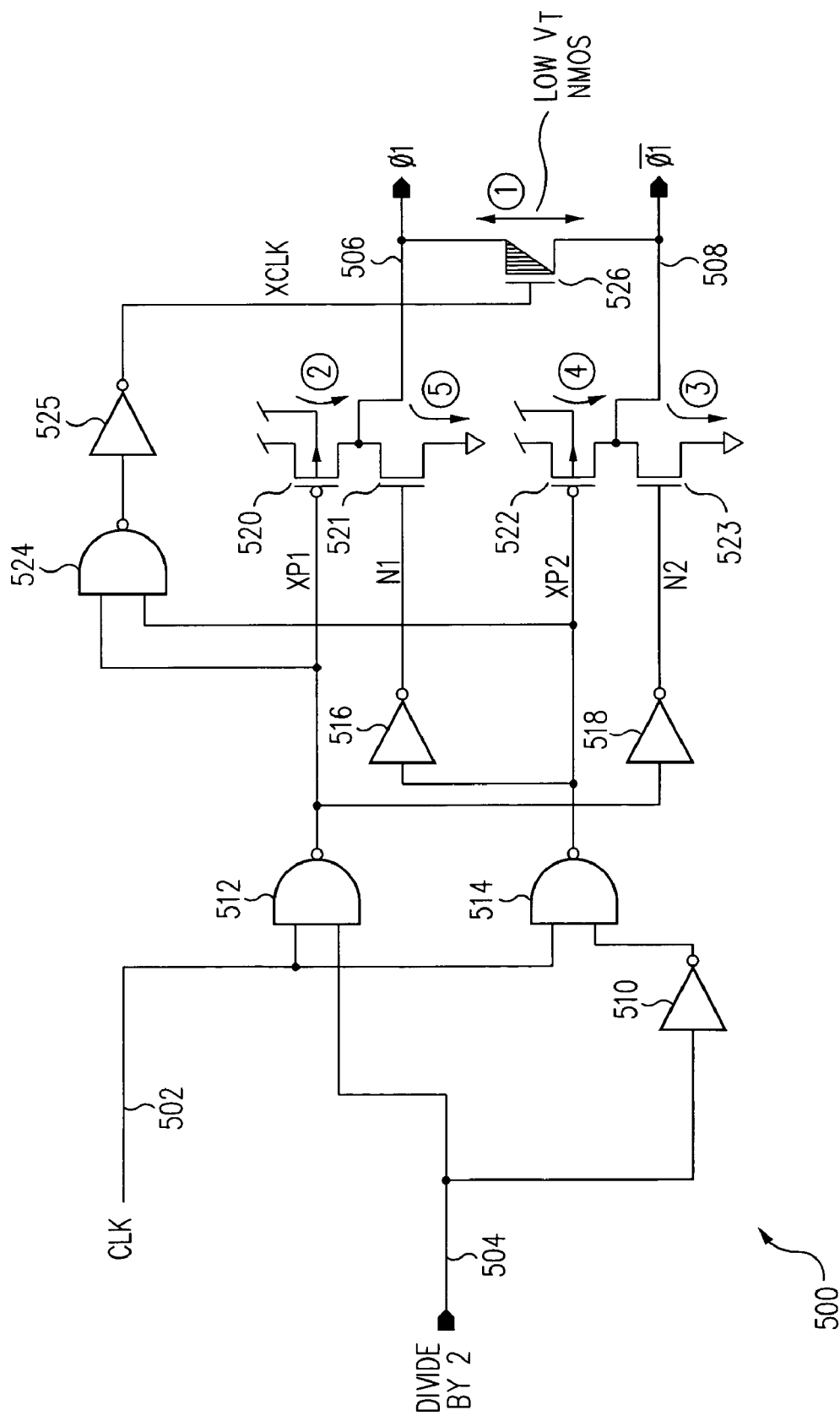
FIG. 14 depicts an exemplary drive pulse generator circuit.
Figure 15:
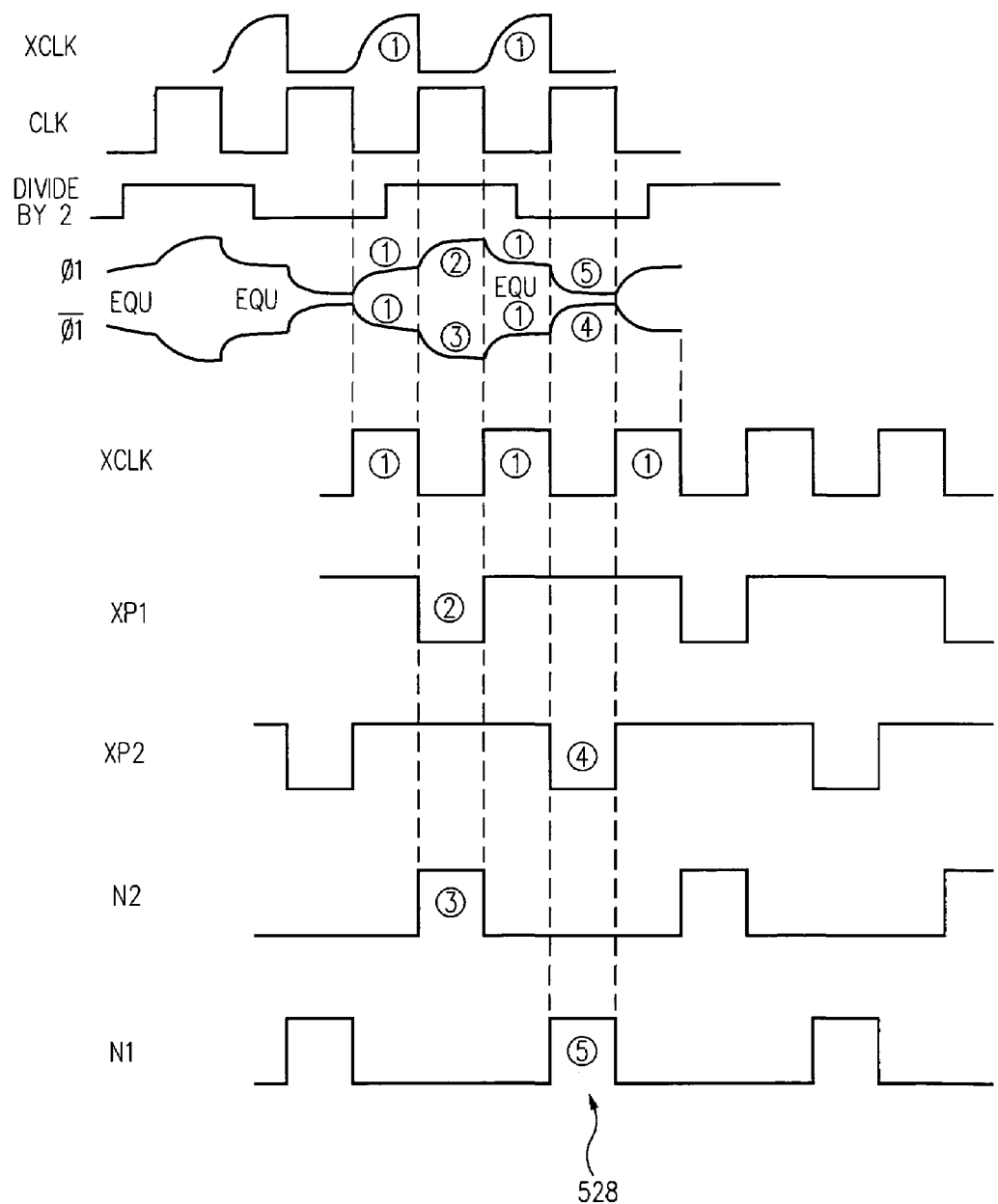
FIG. 15 depicts exemplary waveforms for the drive pulse generator circuit illustrated in FIG. 14.

A drive pulse generator may take any of a wide variety of different circuit forms to achieve charge sharing between complementary clocks, as described above. An exemplary pulse generator 500 is depicted in FIG. 14 and whose operating waveforms are shown in FIG. 15. The pulse generator 500 receives a clock signal 502 of a given frequency and preferably approximately 50% duty cycle, and a DIVIDE-BY-2 clock signal 504 which overlaps the pulses of clock 502, as shown. A group of inverters 510, 516, 518 and NAND gates 512, 514 are arranged to generate four signals XP1, N1, XP2, and N2 which respectively drive the gate terminal of driver devices 520, 521, 522, and 523. Driver devices 520, 521 drive clock output 506 respectively to VDD and VSS, whereas driver devices 522, 523 drive the complementary clock output 508 respectively to VDD and VSS. The NAND gate 524 and inverter 525 generate an XCLK signal which controls the gate terminal of the charge sharing device 526, which preferably is implemented as a low threshold voltage NMOS transistor (e.g., nominally approx. 0.25 volts). The remaining devices are preferably implemented with normal threshold voltages consistent with the design parameters and process technology (e.g., nominally approx. 0.7 volts for both NMOS and PMOS, for use with a VDD of 2–3 volts).

In FIG. 15, the waveforms of the five internal control signals XP1, N1, XP2, N2, and XCLK are depicted, along with the current flow through each of the respective devices controlled by such internal control signal (labeled as currents 1, 2, 3, 4, and 5). For example, the active-high N1 pulse labeled 528 is also labeled with a "5" to indicate current flow through device 521 to discharge the clock output 506 occurs during this pulse.

The DIVIDE-BY-2 signal 504 may be generated external to this drive pulse generator 500, or may be generated within the drive pulse generator 500, such as by a toggle flip-flop, or by any of a variety of logic circuit arrangements. If generated locally, the pulse generator 500 then receives only a single clock input to convey both timing and polarity of the two generated clocks 506, 508. Other pulse generators which may be utilized in a charge pump circuit may be driven by either the same CLK signal 502 (or a buffered version thereof), or by a complementary version of the CLK signal 502 (or a buffered version thereof), as appropriate, to achieve the complementary clocking for both adjacent charge pump stages and corresponding parallel charge pump stages.

Figure 16:
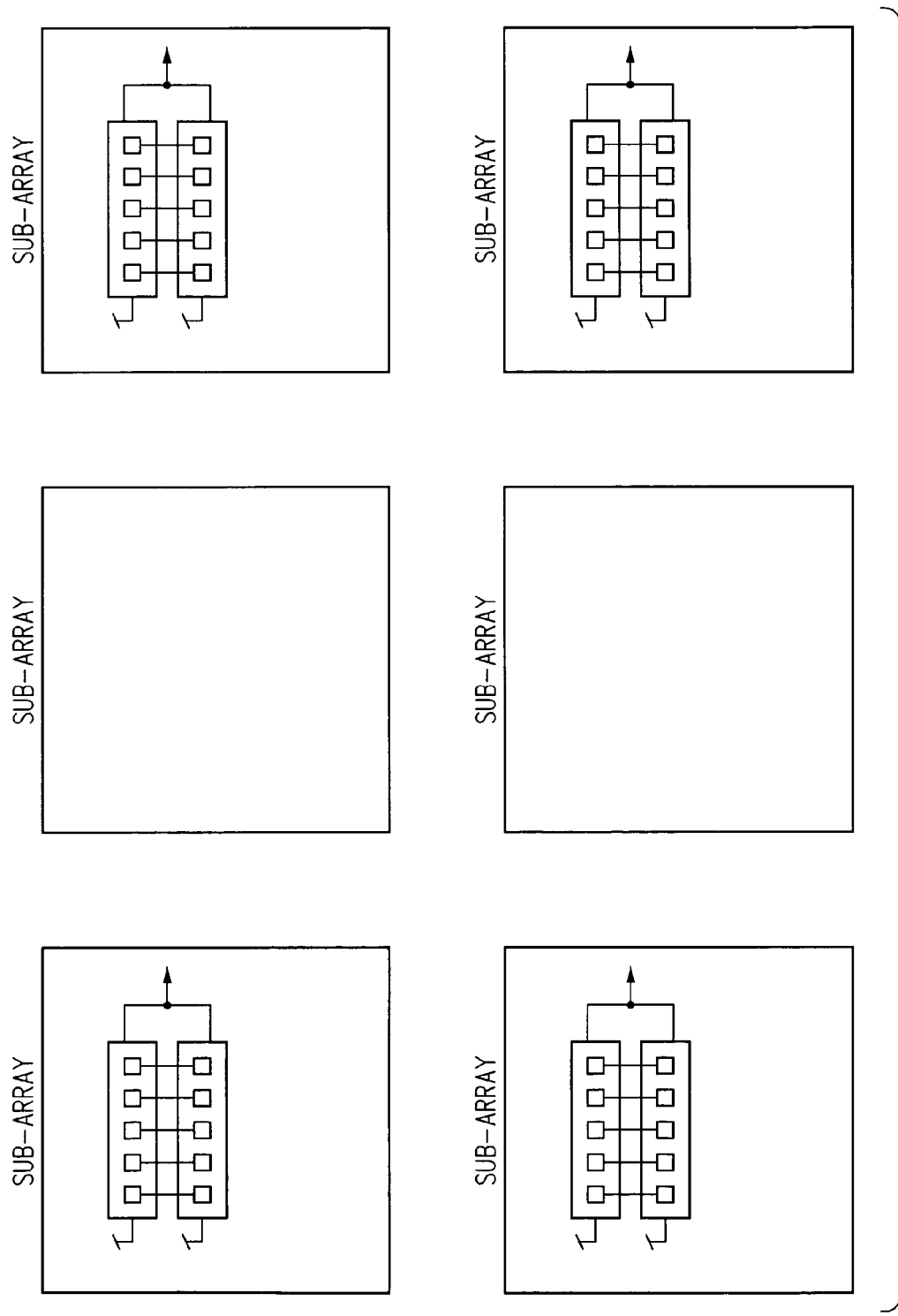
FIG. 16 depicts an integrated circuit having multiple memory sub-arrays, some of which include an associated charge pump circuit.

In some integrated circuit devices, it may be useful to implement more than one charge pump circuit. For example, in a memory device having more than one memory sub-array, a different charge pump circuit may be associated with each of several memory sub-arrays, as depicted in FIG. 16, or a different charge pump circuit may be associated with all such sub-arrays. For certain memory technologies in which the array is fabricated on layers other than the substrate, such as for a monolithic three-dimensional memory array fabricated above a semiconductor substrate, such a charge pump circuit may be implemented beneath a memory sub-array, rather than requiring area outside of the memory array. Exemplary monolithic three-dimensional memory arrays which may be fabricated above a semiconductor substrate are described in U.S. Pat. No. 6,034,882 to Johnson, et al., and in U.S. Pat. No. 6,545,898 to Scheuerlein, et al., the disclosures of which are both hereby incorporated by reference in their entirety.

Figure 17:
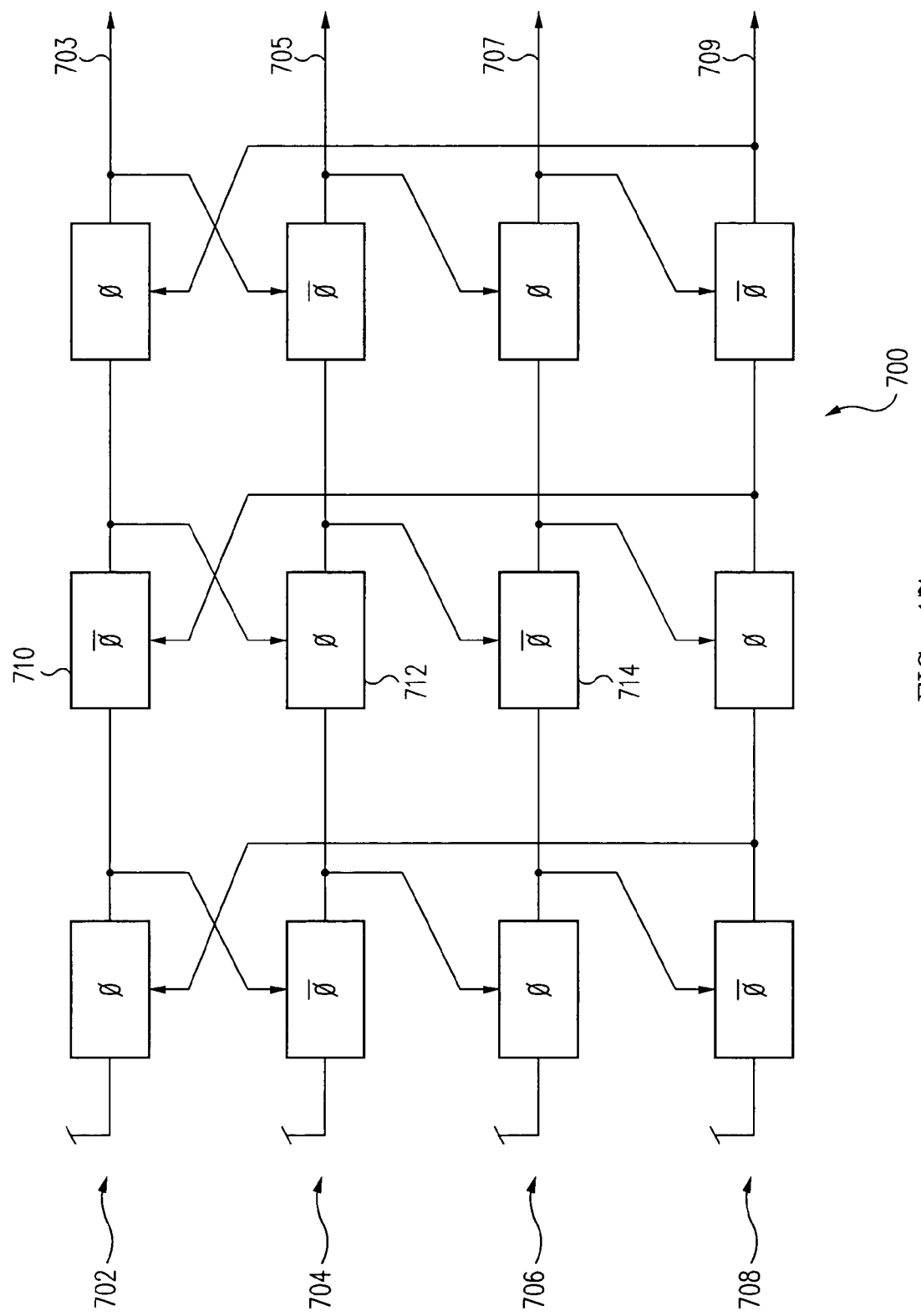
FIG. 17 depicts a charge pump circuit including four parallel strings of serially-connected charge pump stages.

Additional variations of charge pump circuits are contemplated. For example, the teachings herein may be applied to achieve the charge pump circuit 700 depicted in FIG. 17, which includes four parallel strings 702, 704, 706, 708 of series-connected charge pump stages. Rather than cross-coupling pairs of corresponding stages to achieve a symmetrical arrangement (as described in the examples above), a given charge pump stage provides a control signal to a first corresponding parallel charge pump stage (which is driven out-of-phase with the given charge pump stage), but is controlled by a node in a second corresponding parallel charge pump stage (which is also driven out-of-phase with the given charge pump stage). For example, the output of charge pump stage 712 is used as a control node for corresponding parallel charge pump stage 714, but the output of corresponding parallel charge pump stage 710 is used as a control node for the charge pump stage 712. In such a charge pump circuit, each charge pump stage includes a control input responsive to a node from a corresponding parallel charge pump stage, although not necessarily cross-coupled as pairs of corresponding parallel charge pump stages.

The four boosted output nodes 703, 705, 707, 709 may be used individually (as with any of the exemplary circuits described herein), or may be combined into one or more output nodes for the charge pump circuit in similar fashion to that described above.

Other charge pump circuits may incorporate charge pump stages which are responsive to a node of a corresponding charge pump stage other than an output node. For example, a derivative of the output node may be generated for use in controlling another charge pump stage. Such a derivative node may or may not utilize a separate boosting capacitor.

Multiple charge pump circuits, each including parallel strings of serially-connected charge pump stages may be implemented, and the outputs either used independently or combined together into one or more boosted output nodes. For example, five charge pump circuits, each including two parallel strings of cross-coupled corresponding charge pump stages, may be implemented and the outputs combined together using isolation circuits as described herein. Each of the five charge pump circuits may be clocked with pulse signals having the same timing, or may be clocked with a respective pair of complementary clock signals having unique timing. For example, five sets of complementary clock signals, each set differing in phase by approximately 72°, may be used to reduce output ripple in a combined output from all five charge pump circuits.

Other charge pump circuits may include charge transfer switch devices (CTS) which are P-channel field effect transistors (i.e., PMOS), rather than the NMOS CTS devices as found in the exemplary circuits described above. Moreover, the input node to the first charge pump stage in a multi-stage series-connected string of charge pump stages may be connected to a source of voltage (e.g., VDD) more positive than at least one other source of voltage (e.g., VSS) for the charge pump circuit or its clock generator(s). Conversely, the input node to the first charge pump stage in the string may be connected to a source of voltage (e.g., VSS) more negative than at least one other source of voltage (e.g., VDD) for the charge pump circuit or its clock generator(s), particularly when generating a negative voltage (e.g., typically negative relative to VSS).

While the charge pump circuits described above show more than one charge pump stage in each of two or more parallel strings, and while the power efficiency advantages of such circuits are more apparent with multiple stages in each parallel string, other useful charge pump circuits may use a single charge pump stage in each "string," such as a charge pump circuit having a single pair of corresponding, cross-coupled charge pump stages.

As used herein, an integrated circuit having a three-dimensional memory array is assumed to be a monolithic integrated circuit, rather than an assembly of more than one monolithic integrated circuit. The methods and apparatus of the present invention may also be used to advantage in monolithic three dimensional memories such as, for example, a three-dimensional, non-volatile, field-programmable memory array (both write-once and/or re-writable memory arrays). Moreover, the methods and apparatus of the present invention may also be used to advantage in integrated circuits including two-dimensional arrays, and in many other non-memory integrated circuits.

The methods and apparatus of the present invention may also be used to advantage in other monolithic three dimensional memories, such as those described in Johnson et al., U.S. Pat. No. 6,034,882, "Vertically-Stacked, Field Programmable, Nonvolatile-Memory and Method of Fabrication"; Johnson, U.S. Pat. No. 6,525,953, "Vertically-Stacked, Field Programmable, Nonvolatile-Memory and Method of Fabrication"; Knall et al., U.S. Pat. No. 6,420,215, "Three Dimensional Memory Array and Method of Fabrication"; Lee et al., U.S. patent application Ser. No. 09/927,648, "Dense Arrays and Charge Storage Devices, and Methods for Making Same," filed Aug. 13, 2001; Herner et al., U.S. patent application Ser. No. 10/326,470, "An Improved Method for Making High Density Nonvolatile Memory," filed Dec. 19, 2002; Walker et al., U.S. patent application Ser. No. 10/335,089, "Method for Fabricating Programmable Memory Array Structures Incorporating Series-Connected Transistor Strings," filed Dec. 31, 2002; Scheuerlein et al., U.S. patent application Ser. No. 10/335,078, "Programmable Memory array Structure Incorporating Series-Connected Transistor Strings and Methods for Fabrication and Operation of Same," filed Dec. 31, 2002; Cleeves, U.S. patent application Ser. No. 10/185,508, "Three Dimensional Memory," filed Jun. 27, 2002; and Johnson, U.S. patent application Ser. No. 10/185,208, "Low-cost, Serially-Connected, Multi-Level Mask-Programmable Read-Only Memory," filed Jun. 27, 2002, all assigned to the assignee of the present invention and hereby incorporated by reference.

In the descriptions herein, certain clock signals may be labeled as true clock signals, while others are labeled as complement clock signals. Such a particular polarity designation is intended to convey the relative polarity between the various clock signals, and consequently the true and complement clock signals may be interchanged with no ill effect. As used herein, no distinction is intended between a clock signal and a pulse signal, although it is understood that the term "clock signal" may convey additional meaning in other contexts.

As used herein, and unless the context requires otherwise, a "complementary pair" of clock signals or pulse signals need not precisely be at all times complementary, but is meant to include a pair of signals that are only generally complementary. For example, the complementary clock signals may overlap during each such signal's transition from high to low and from low to high. In some embodiments, including certain embodiments utilizing NMOS CTS devices, the clocks may be adjusted to have non-overlapping positive pulses.

As used herein, the amplitude of a signal (e.g., such as a clock signal) refers to the difference in voltage between the high level and the low level of the signal. If such a signal has VSS or the ground reference as its low level, and VDD for its high level, the signal may be termed a VDD-level signal or a full VDD-level signal.

While the invention has been described above in the context of these several exemplary embodiments, the invention is not to be limited to such embodiments. For example, the invention is not limited to charge pump circuits implemented to generate a voltage above VDD, for charge pump circuits may be configured to generate an output voltage below VSS (i.e., the lower power supply reference voltage). Moreover, an initial input voltage other than VDD may also be used to generate an output voltage which is a function of an arbitrary reference voltage VR, rather than one which is a function of VDD.

Regarding general terminology used herein, it will be appreciated by one skilled in the art that any of several expressions may be equally well used when describing the operation of a circuit including the various signals and nodes within the circuit. Any kind of signal, whether a logic signal or a more general analog signal, takes the physical form of a voltage level (or for some circuit technologies, a current level) of a node within the circuit. It may be correct to think of signals being conveyed on wires or buses. For example, one might describe a particular circuit operation as "the output of circuit 10 drives the voltage of node 11 toward VDD, thus asserting the signal OUT conveyed on node 11." This is an accurate, albeit somewhat cumbersome expression. Consequently, it is well known in the art to equally describe such a circuit operation as "circuit 10 drives node 11 high," as well as "node 11 is brought high by circuit 10," "circuit 10 pulls the OUT signal high" and "circuit 10 drives OUT high." Such shorthand phrases for describing circuit operation are more efficient to communicate details of circuit operation, particularly because the schematic diagrams in the figures clearly associate various signal names with the corresponding circuit blocks and node names. For convenience, an otherwise unnamed node conveying the CLK signal may be referred to as the CLK node. Similarly, phrases such as "pull high," "drive high," and "charge" are generally synonymous unless otherwise distinguished, as are the phrases "pull low," "drive low," and "discharge." It is believed that use of these more concise descriptive expressions enhances clarity and teaching of the disclosure. It is to be appreciated by those skilled in the art that each of these and other similar phrases may be interchangeably used to describe common circuit operation, and no subtle inferences should be read into varied usage within this description.

Frequently logic signals are named in a fashion to convey which level is the active level. For example, CLKEN is commonly used to name an active-high clock enable signal, because the true polarity is implied in the name. Conversely, CLKENB, /CLKEN, CLKEN#, CLKEN*, CLKEN_L, CLKEN_C, or #CLKEN are commonly used to name an active-low clock enable signal, because one of the many common expressions indicating the complement polarity is used in the name. Complementary pairs of signals or node names, such as true and complement clock lines, and true and complement bit lines within a column of a memory array, are frequently named to clarify the polarity of both nodes or signals (e.g., BL3T and BL3C; BL6_T and BL6_C) and in other instances, only the complement polarity may be indicated in the names (e.g., CLK and /CLK, or CLK and CLK#, or BL and BLB). In still other cases, two "complementary" signals are both inactive at one state (e.g., both inactive low), and only one is driven to an active level to convey the polarity of the signal. It is to be appreciated by those skilled in the art that these and other similar phrases may be used to name the signals and nodes. The schematic diagrams and accompanying description of the signals and nodes should in context be clear.

A transistor may be conceptualized as having a control terminal which controls the flow of current between a first current handling terminal (or current carrying terminal) and a second current handling terminal. An appropriate condition on the control terminal causes a current to flow from/to the first current handling terminal and to/from the second current handling terminal (for typical operating voltages of the first and second current handling terminals). In a bipolar transistor, the first current handling terminal may be deemed the emitter, the control terminal deemed the base, and the second current handling terminal deemed the collector. An MOS transistor may likewise be conceptualized as having a control terminal which controls the flow of current between a first current handling terminal and a second current handling terminal. Although MOS transistors are frequently discussed as having a drain, a gate, and a source, in most such devices the drain is interchangeable with the source. This is because the layout and semiconductor processing of the transistor is symmetrical (which is typically not the case for bipolar transistors). For an N-channel MOS transistor, the current handling terminal normally residing at the higher voltage is customarily called the drain. The current handling terminal normally residing at the lower voltage is customarily called the source. A sufficiently high voltage on the gate (relative to the source voltage) causes a current to therefore flow from the drain to the source (provided the respective voltage of the drain and source are different). For an enhancement mode N-channel device, a positive gate-to-source voltage greater than the threshold voltage (including body effect) is sufficient. The source voltage referred to in N-channel MOS device equations merely refers to whichever current handling terminal has the lower voltage at any given point in time. For example, the "source" of the N-channel device of a bi-directional CMOS transfer gate depends on which side of the transfer gate is at the lower voltage. To reflect this symmetry of most N-channel MOS transistors, the control terminal may be deemed the gate, the first current handling terminal may be termed the "drain/source", and the second current handling terminal may be termed the "source/drain". Such a description is equally valid for a P-channel MOS transistor, since the polarity between drain and source voltages, and the direction of current flow between drain and source, is not implied by such terminology. Alternatively, one current handling terminal may arbitrarily deemed the "drain" and the other deemed the "source", with an implicit understanding that the two are not distinct, but interchangeable.

Regarding power supplies, a single positive power supply voltage (e.g., a 2.5 volt power supply) used to power a circuit is frequently named the "VDD" power supply. In an integrated circuit, transistors and other circuit elements are actually connected to a VDD terminal or a VDD node, which is then operably connected to the VDD power supply. The colloquial use of phrases such as "tied to VDD" or "connected to VDD" is understood to mean "connected to the VDD node", which is typically then operably connected to actually receive the VDD power supply voltage during use of the integrated circuit.

The reference voltage for such a single power supply circuit is frequently called "VSS." Transistors and other circuit elements are actually connected to a VSS terminal or a VSS node, which is then operably connected to the VSS power supply during use of the integrated circuit. Frequently the VSS terminal is connected to a ground reference potential, or just "ground." Describing a node which is "grounded" by a particular transistor or circuit (unless otherwise defined) means the same as being "pulled low" or "pulled to ground" by the transistor or circuit.

Generalizing somewhat, the first power supply terminal is frequently named "VDD", and the second power supply terminal is frequently named "VSS." Both terms may appear either using subscripts (e.g., $V_{DD}$) or not. Historically the nomenclature "$V_{DD}$" implied a DC voltage connected to the drain terminal of an MOS transistor and $V_{SS}$ implied a DC voltage connected to the source terminal of an MOS transistor. For example, old PMOS circuits used a negative VDD power supply, while old NMOS circuits used a positive VDD power supply. Common usage, however, frequently ignores this legacy and uses VDD for the more positive supply voltage and VSS for the more negative (or ground) supply voltage unless, of course, defined otherwise. Describing a circuit as functioning with a "VDD supply" and "ground" does not necessarily mean the circuit cannot function using other power supply potentials. Other common power supply terminal names are "VCC" (a historical term from bipolar circuits and frequently synonymous with a +5 volt power supply voltage, even when used with MOS transistors which lack collector terminals) and "GND" or just "ground."

The block diagrams herein may be described using the terminology of a single node connecting the blocks. Nonetheless, it should be appreciated that, when required by the context, such a "node" may actually represent a pair of nodes for conveying a differential signal, or may represent multiple separate wires (e.g., a bus) for carrying several related signals or for carrying a plurality of signals forming a digital word.

While circuits and physical structures are generally presumed, it is well recognized that in modern semiconductor design and fabrication, physical structures and circuits may be embodied in computer readable descriptive form suitable for use in subsequent design, test or fabrication activities as well as in resultant fabricated semiconductor integrated circuits. Accordingly, claims directed to traditional circuits or structures may, consistent with particular language thereof, read upon computer readable encodings and representations of same, whether embodied in media or combined with suitable reader facilities to allow fabrication, test, or design refinement of the corresponding circuits and/or structures. The invention is contemplated to include circuits, related methods or operation, related methods for making such circuits, and computer-readable medium encodings of such circuits and methods, all as described herein, and as defined in the appended claims. As used herein, a computer-readable medium includes at least disk, tape, or other magnetic, optical, semiconductor (e.g., flash memory cards, ROM), or electronic medium and a network, wireline, wireless or other communications medium. An encoding of a circuit may include circuit schematic information, physical layout information, behavioral simulation information, and/or may include any other encoding from which the circuit may be represented or communicated.

The foregoing detailed description has described only a few of the many possible implementations of the present invention. For this reason, this detailed description is intended by way of illustration, and not by way of limitations. Variations and modifications of the embodiments disclosed herein may be made based on the description set forth herein, without departing from the scope and spirit of the invention. Moreover, the embodiments described above are specifically contemplated to be used alone as well as in various combinations. It is only the following claims, including all equivalents, that are intended to define the scope of this invention. Accordingly, other embodiments, variations, and improvements not described herein are not necessarily excluded from the scope of the invention.

What is claimed is:

1. A charge pump circuit for generating a boosted voltage, said circuit comprising:
    two charge pump stages coupled other than in series with each other, each stage respectively including
        an input and an output;
        a charge transfer switch (CTS) coupling the input to the output, and having a control terminal for controlling opening and closing the CTS;
        a control circuit having an output coupled to the control terminal; and
        a charge pump capacitor coupled to the output of the stage;
    wherein the control circuit for each pump stage is respectively coupled to the output of the pump stage and to the output of the other pump stage.

2. The charge pump circuit, as recited in claim 1, wherein the control circuit for one charge pump stage is configured to couple the CTS control terminal for the one charge pump stage to:
    the output of the other charge pump stage to turn on the CTS for the one charge pump stage; and
    the input of the one charge pump stage to turn off the CTS for the one charge pump stage.

3. The charge pump circuit, as recited in claim 2, wherein the control circuit for the other charge pump stage is configured to couple the CTS control terminal for the other charge pump stage to:
    the output of the one charge pump stage to turn on the CTS for the other charge pump stage; and
    the input of the other charge pump stage to turn off the CTS for the other charge pump stage.

4. The charge pump circuit, as recited in claim 2, wherein the control circuit for said one charge pump stage comprises:
a first transistor, responsive to the output of said one charge pump stage, for coupling the CTS control terminal for the one charge pump stage to the output of the other charge pump stage; and
a second transistor, responsive to the output of said one charge pump stage, for coupling the CTS control terminal for the one charge pump stage to the input of said one charge pump stage.

5. The charge pump circuit, as recited in claim 1, wherein each of the pair of charge pump stages has a substantially equal average voltage coupled to its respective input.

6. A charge pump circuit for generating a boosted voltage, said circuit comprising:
two charge pump stages coupled other than in series with each other, each stage respectively including
an input and an output;
a charge transfer switch (CTS) coupling the input to the output, and having a control terminal for controlling opening and closing the CTS;
a control circuit having an output coupled to the control terminal; and
a charge pump capacitor coupled to the output of the stage;
wherein the control circuit for each pump stage is respectively coupled to the output of the pump stage and to a node of the other pump stage;
wherein at least one pump stage further comprises a startup device connected in parallel with its CTS.

7. The charge pump circuit, as recited in claim 6, wherein at least one charge pump stage comprises a diode-connected transistor startup device.

8. The charge pump circuit, as recited in claim 6, wherein at least one charge pump stage comprises a diode startup device.

9. The charge pump circuit, as recited in claim 1, further comprising an output circuit for combining a respective boosted voltage signal on the respective output of each of a pair of charge pump stages onto a single output node for the charge pump circuit.

10. The charge pump circuit, as recited in claim 9, wherein the output circuit comprises at least a pair of cross-coupled PMOS devices.

11. The charge pump circuit, as recited in claim 9, wherein the output circuit comprises at least a pair of cross-coupled NMOS devices.

12. The charge pump circuit, as recited in claim 1, comprising NMOS CTS devices.

13. The charge pump circuit, as recited in claim 1, comprising PMOS CTS devices.

14. The charge pump circuit, as recited in claim 1, further comprising a second pair of charge pump stages, each of said second pair connected in series with an associated one of the first-mentioned two charge pump stages, each stage of said second pair respectively including:
an input and an output;
a charge transfer switch (CTS) coupling the input to the output, and having a control terminal for controlling opening and closing the CTS;
a control circuit having an output coupled to the control terminal; and
a charge pump capacitor coupled to the output of the stage;
wherein the control circuit for each pump stage of the second pair of charge pump stages is respectively coupled to the output of the pump stage and to the output of the other pump stage of the second pair.

15. The charge pump circuit, as recited in claim 14, comprising charge pump stages having N-channel CTS devices, and wherein the input of at least one charge pump stage is coupled to receive a supply voltage more positive than at least another supply voltage for the charge pump circuit.

16. The charge pump circuit, as recited in claim 15, further comprising an output circuit for combining a respective boosted voltage signal on the respective output of each of a pair of charge pump stages onto a single output node for the charge pump circuit, said output circuit comprising at least a pair of cross-coupled PMOS devices.

17. The charge pump circuit, as recited in claim 14, comprising charge pump stages having P-channel CTS devices, and wherein the input of at least one charge pump stage is coupled to receive a supply voltage more negative than at least another supply voltage for the charge pump circuit.

18. The charge pump circuit, as recited in claim 17, further comprising an output circuit for combining a respective boosted voltage signal on the respective output of each of a pair of charge pump stages onto a single output node for the charge pump circuit, said output circuit comprising at least a pair of cross-coupled NMOS devices.

19. The charge pump circuit, as recited in claim 14, wherein:
corresponding pairs of charge pump stages are driven by substantially complementary pulse signals; and
adjacent series-connected charge pump stages are driven by substantially complementary pulse signals.

20. The charge pump circuit, as recited in claim 19, further comprising means for recycling charge between the substantially complementary pulse signals driving a corresponding pair of charge pump stages.

21. The charge pump circuit, as recited in claim 20, wherein the means for recycling charge comprises a charge recycling circuit for coupling at least a pair of complementary pulses together during at least a portion of a pulsing cycle.

22. The charge pump circuit of claim 1, embodied in an integrated circuit including a three-dimensional memory array.

23. The charge pump circuit of claim 1 embodied in computer readable descriptive form suitable for use in design, test or fabrication of an integrated circuit.

24. A charge pump circuit for generating a boosted voltage, said circuit comprising a pair of charge pump stages having a substantially equal average voltage on respective input nodes thereof, each charge pump stage of the pair including a respective charge transfer switch (CTS) having a control terminal for controlling opening and closing the CTS, which control terminal is responsive to an output of the charge pump stage and responsive to an output node of the other charge pump stage of the pair.

25. The charge pump circuit, as recited in claim 24, wherein the respective input nodes of each charge pump stage of the pair are not coupled together.

26. The charge pump circuit, as recited in claim 24, wherein each charge pump stage includes a control circuit for controlling the CTS of the stage, said control circuit including:
an output coupled to the CTS;

a timing input coupled to an output of the charge pump stage; and a first voltage input coupled to an output of the other charge pump stage.

27. The charge pump circuit, as recited in claim 26, wherein said control circuit for each charge pump stage further comprises a second voltage input coupled to the input of the stage.

28. The charge pump circuit, as recited in claim 27, wherein said control circuit for each charge pump stage comprises an NMOS device and a PMOS device having respective gate terminals both coupled to the timing input for the control circuit.

29. The charge pump circuit of claim 24, embodied in an integrated circuit including a three-dimensional memory array.

30. The charge pump circuit of claim 24 embodied in computer readable descriptive form suitable for use in design, test or fabrication of an integrated circuit.

31. A circuit for generating a boosted voltage, said circuit comprising a pair of multi-stage series-connected charge pumps, each of said pair having substantially symmetrical inter-coupled corresponding charge pump stages, each charge pump stage including a respective charge transfer switch control circuit having a control terminal for controlling opening and closing the CTS, which control terminal is responsive to an output of the charge pump stage and responsive to a node of a corresponding charge pump stage;

wherein corresponding charge pump stages are cross-coupled whereby each charge pump stage comprises a first respective node which is coupled to a second respective node of a corresponding charge pump stage; and wherein the respective first node of each stage is an output node of the stage.

32. The circuit, as recited in claim 31, wherein pulse signals associated with corresponding stages are substantially out of phase.

33. A circuit for generating a boosted voltage, said circuit comprising:

a pair of multi-stage series-connected charge pumps, each of said pair having substantially symmetrical inter-coupled corresponding charge pump stages, each charge pump stage including a respective charge transfer switch control circuit which is responsive to an output of the charge pump stage and responsive to a node of a corresponding charge pump stage; and at least one multi-stage series-connected charge pump having at least one stage closer to an output thereof which includes a smaller pump capacitor than that of a stage more distant from said output.

34. The circuit, as recited in claim 33, comprising a plurality of series-connected charge pump stages which are each sized proportionally smaller than its preceding stage.

35. The circuit of claim 31, embodied in an integrated circuit including a three-dimensional memory array.

36. An integrated circuit comprising a plurality of memory sub-arrays, each sub-array associated with a respective circuit for generating a boosted voltage as recited in claim 31.

37. The integrated circuit, as recited in claim 36, wherein the plurality of memory sub-arrays comprises a three-dimensional memory array having at least two memory planes disposed above a substrate.

38. The integrated circuit, as recited in claim 37, wherein each respective circuit for generating a boosted voltage is disposed beneath its associated sub-array.

39. The circuit of claim 31 embodied in computer readable descriptive form suitable for use in design, test or fabrication of an integrated circuit.

40. A method for generating a boosted voltage, said method comprising the steps of:

providing at least two multi-stage series-connected charge pump circuits having substantially symmetrical inter-coupled corresponding charge pump stages, each charge pump stage including a charge transfer switch coupling an input thereof to an output thereof, and including a pump capacitor coupled to the output thereof; and controlling opening and closing the charge transfer switch in each charge pump stage of one series-connected charge pump circuit responsive at least to its own output and to the output of the corresponding charge pump stage in the other series-connected charge pump circuit.

41. The method, as recited in claim 40, further comprising:

driving corresponding charge pump stages in both series-connected charge pump circuits with substantially complementary pulse signals; and driving adjacent series-connected charge pump stages in each charge pump circuit with substantially complementary pulse signals.

42. The method, as recited in claim 40, further comprising coupling a control terminal for the charge transfer switch in at least one charge pump stage to:

the output of the corresponding charge pump stage in the other series-connected charge pump circuit to turn on the charge transfer switch; and the input of said at least one charge pump stage to turn off the charge transfer switch.

43. The method, as recited in claim 40, further comprising combining the respective output signal from the respective last charge pump stage of both series-connected charge pump circuits to generate a single output conveying the boosted voltage.

44. An integrated circuit comprising:

at least two multi-stage series-connected charge pump circuits having substantially symmetrical inter-coupled corresponding charge pump stages, each charge pump stage including a charge transfer switch coupling an input thereof to an output thereof, and including a pump capacitor coupled to the output thereof; and means for controlling opening and closing the charge transfer switch in each charge pump stage of one series-connected charge pump circuit responsive at least to its own output and to the output of the corresponding charge pump stage in the other series-connected charge pump circuit.

45. The integrated circuit, as recited in claim 44, further comprising:

means for driving corresponding charge pump stages in both series-connected charge pump circuits with substantially complementary pulse signals; and means for driving adjacent series-connected charge pump stages in each charge pump circuit with substantially complementary pulse signals.

46. The integrated circuit, as recited in claim 44, wherein said means for controlling opening and closing the charge transfer switch in at least one charge pump stage comprises:

means for coupling a control terminal for the charge transfer switch to the output of the corresponding charge pump stage in the other series-connected charge pump circuit to turn on the charge transfer switch; and means for coupling the control terminal for the charge transfer switch to the input of said at least one charge pump stage to turn off the charge transfer switch.

47. The integrated circuit, as recited in claim 44, further comprising means for combining the respective output signal from the respective last charge pump stage of both series-connected charge pump circuits to generate a single output conveying the boosted voltage.

48. The integrated circuit, as recited in claim 44, further comprising a three-dimensional memory array having at least two memory planes disposed above a substrate.

49. The integrated circuit of claim 44 embodied in computer readable descriptive form suitable for use in design, test or fabrication of the integrated circuit.

50. A circuit for generating a boosted voltage, said circuit comprising:

a first, second, third, and fourth multi-stage series-connected charge pumps, each having inter-coupled corresponding charge pump stages, each charge pump stage within a multi-stage series-connected charge pump including a respective charge transfer switch control circuit which is responsive to an output of the charge pump stage and responsive to a node of a corresponding charge pump stage within a different multi-stage series-connected charge pump; and wherein each charge pump stage of the first multi-stage series-connected charge pump comprises a first respective node which is coupled to a second respective node of a corresponding charge pump stage within the second multi-stage series-connected charge pump; and further comprises a second respective node which is coupled to a first respective node of a corresponding charge pump stage within the third multi-stage series-connected charge pump.

51. The circuit, as recited in claim 31, wherein corresponding charge pump stages are other than cross-coupled whereby each charge pump stage comprises a first respective node which is coupled to a second respective node of a corresponding charge pump stage.

52. The circuit, as recited in claim 51, wherein the respective first node of each charge pump stage is an output node of the charge pump stage.

53. The charge pump circuit, as recited in claim 16, wherein, for each respective one of the first-mentioned two charge pump stages, the respective control circuit is configured to couple the respective CTS control terminal for one respective charge pump stage to:

the output of the other respective charge pump stage to turn on the CTS for the one respective charge pump stage; and the input of the one respective charge pump stage to turn off the CTS for the one respective charge pump stage.

* * * * *

UNITED STATES PATENT AND TRADEMARK OFFICE
CERTIFICATE OF CORRECTION

| | | |
|---|---|---|
| PATENT NO. | : 7,023,260 B2 | Page 1 of 1 |
| APPLICATION NO. | : 10/610315 | |
| DATED | : April 4, 2006 | |
| INVENTOR(S) | : Tyler J. Thorp and Roy E. Scheuerlein | |

It is certified that error appears in the above-identified patent and that said Letters Patent is hereby corrected as shown below:

<u>Column 15</u>
Line 64, the word "modem" should read -- modern --.

Signed and Sealed this

Twenty-second Day of August, 2006

JON W. DUDAS
*Director of the United States Patent and Trademark Office*